(12) United States Patent
Moore et al.

(10) Patent No.: US 11,560,188 B2
(45) Date of Patent: Jan. 24, 2023

(54) AUTOMATIC TRACTOR TRAILER COUPLING

(71) Applicant: ISEE, Inc., Cambridge, MA (US)

(72) Inventors: Frederick M. Moore, Somerville, MA (US); Gregory J. Paraskos, Medford, MA (US)

(73) Assignee: ISEE, Inc., Cambridge, MA (US)

(*) Notice: Subject to any disclaimer, the term of this patent is extended or adjusted under 35 U.S.C. 154(b) by 266 days.

(21) Appl. No.: 16/927,809

(22) Filed: Jul. 13, 2020

(65) Prior Publication Data

US 2021/0061376 A1 Mar. 4, 2021

Related U.S. Application Data

(60) Provisional application No. 62/946,472, filed on Dec. 11, 2019, provisional application No. 62/898,327, filed on Sep. 10, 2019, provisional application No. 62/873,550, filed on Jul. 12, 2019.

(51) Int. Cl.
*B62D 53/12* (2006.01)
*B60D 1/64* (2006.01)

(52) U.S. Cl.
CPC .............. *B62D 53/125* (2013.01); *B60D 1/64* (2013.01)

(58) Field of Classification Search
CPC .... B62D 53/125; B62D 53/0828; B60D 1/64; B60D 1/363
See application file for complete search history.

(56) References Cited

U.S. PATENT DOCUMENTS

| | | | |
|---|---|---|---|
| 5,346,239 A * | 9/1994 | Wohlhuter | B62D 53/125 280/422 |
| 2020/0086703 A1* | 3/2020 | Johnson | B62D 53/125 |
| 2021/0053407 A1* | 2/2021 | Smith | B25J 9/1697 |
| 2021/0078653 A1* | 3/2021 | Hartmann | B62D 53/12 |

FOREIGN PATENT DOCUMENTS

| | | | | |
|---|---|---|---|---|
| DE | 102019202352 A1 * | 8/2020 | | B60D 1/015 |
| WO | WO-9111338 A1 * | 8/1991 | | B60D 1/64 |

\* cited by examiner

*Primary Examiner* — Jacob D Knutson
*Assistant Examiner* — Ryan Edward Hardy
(74) *Attorney, Agent, or Firm* — Prince Lobel Tye LLP; Brian M. Dingman

(57) ABSTRACT

A system and method for automatically coupling at least one of an air line or an electrical line of a tractor to a trailer that is configured to be pulled by the tractor. A moveable arm is mounted to the tractor and is configured to exhibit at least one degree of freedom (DOF) of motion relative to the tractor. The moveable arm carries at least one of an air line connector or an electrical connector. A trailer coupling head is mounted to the trailer and carries at least one of an air line connector or an electrical connector that are configured to be connected to the at least one of an air line connector or an electrical connector of the tractor. The trailer coupling head can be moved in at least a vertical DOF relative to the ground by the automatic coupling system.

21 Claims, 27 Drawing Sheets

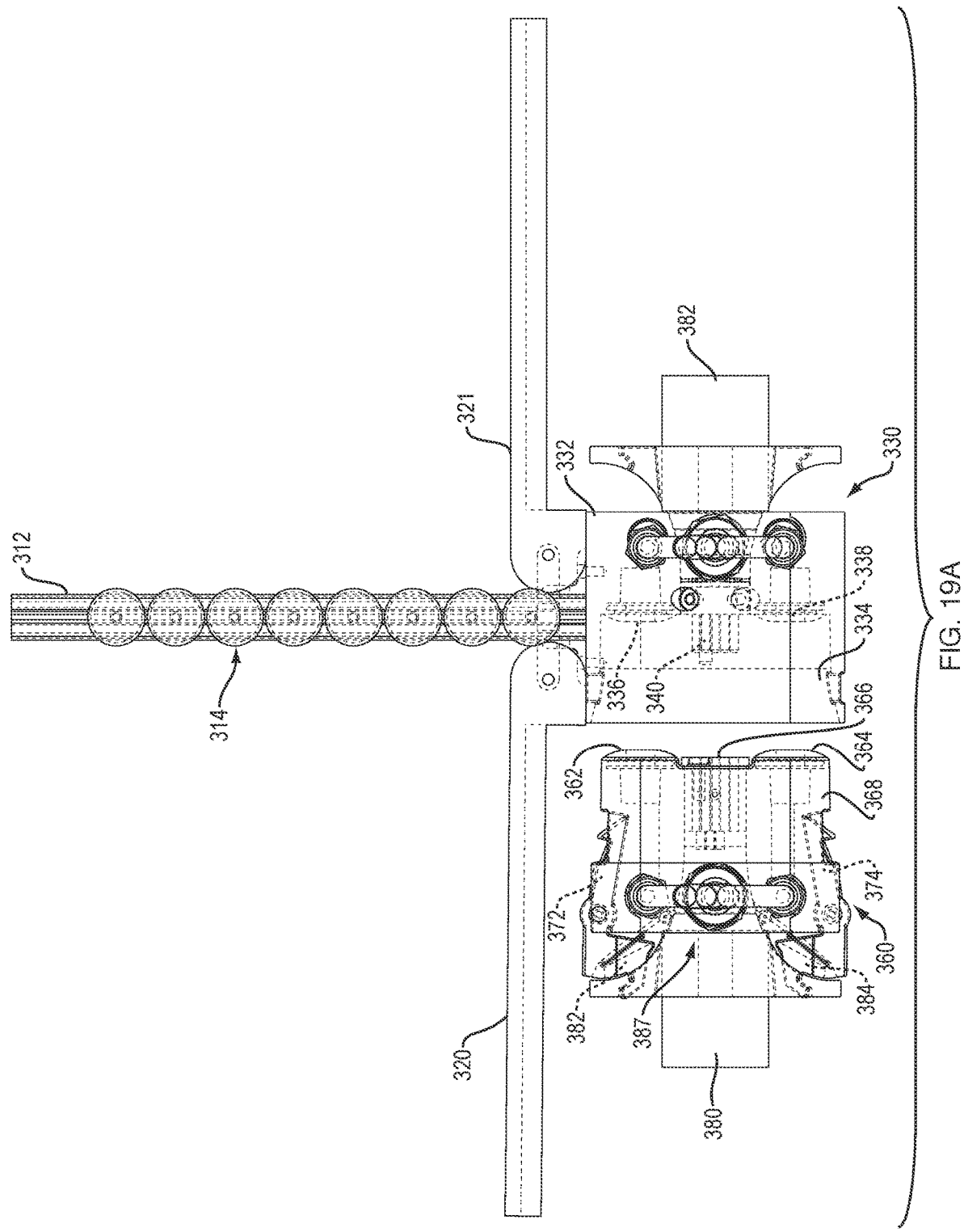

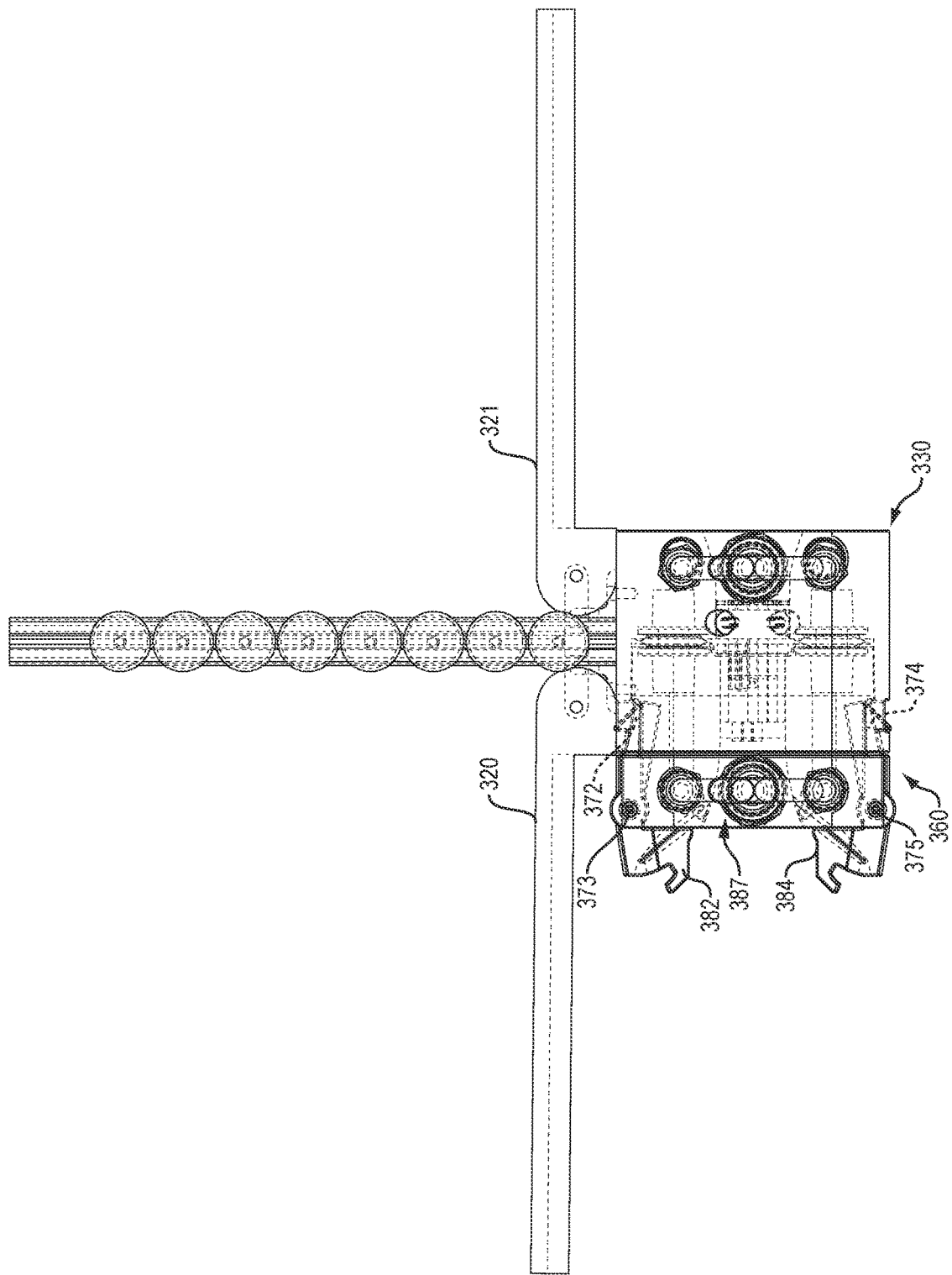

AUTOMATIC TRACTOR TRAILER COUPLING

CROSS-REFERENCE TO RELATED APPLICATIONS

This application claims priority of the following three Provisional Applications, the entire disclosures of which are incorporated herein by reference for all purposes: 62/873,550, filed on Jul. 12, 2019; 62/898,327, filed on Sep. 10, 2019; and 62/946,472, filed on Dec. 11, 2019.

BACKGROUND

This disclosure relates to coupling a tractor to a trailer.

Trailers are frequently docked or coupled, and undocked or uncoupled, from tractors in cargo yards, warehouse facilities, and intermodal facilities. The docking and unlocking operations require human intervention, making them relatively expensive and time consuming.

SUMMARY

The automatic tractor trailer coupling system and method involves a tractor coupling head that is movably carried by the tractor, and a trailer coupling head that is carried by the trailer. The heads carry devices that are used to couple air lines of the tractor to air lines of the trailer, such as lines for braking and emergency braking. Additionally or alternatively the heads carry devices that are used to couple electrical lines of the tractor to the trailer, such as electrical signals that are used for trailer running and braking lights. The degrees of freedom (DOF) of motion needed to bring the coupling heads into proper alignment and contact to accomplish the air/electrical coupling are provided in part on the tractor side and in part on the trailer side. At least the tractor side has active motion control. By allowing motion in one or more DOF on the trailer side, the complexity of tractor side assembly can be reduced. In some examples the trailer coupling head can be moved in at least a vertical DOF relative to the ground. In an example this trailer coupling head vertical DOF can be accomplished by providing for passive motion of the trailer coupling head in the vertical DOF. In another example this trailer coupling head vertical DOF can be accomplished by control of the height of the trailer via automated control of the tractor boom that controls the height of the tractor's fifth wheel coupling that is configured to couple with the king pin of the trailer.

In an example there are two DOF in the tractor side and two DOF on trailer side. In an example the tractor DOF can include Z axis (fore and aft) translation and Y axis (vertical) rotation (i.e., yaw). In an example the Y axis is locked until a threshold torque load is exceeded. The Y axis rotation is passive. The Z axis translation is driven by one or more actuators. No vision system is needed. There are simple sensors for active control. In an example, in the trailer there are Y axis translation and Y axis rotation DOF. The trailer side DOF motions are passive. In another example the height of the trailer is controlled via control of the tractor fifth wheel boom. This can reduce or eliminate the range of Y axis translation needed on trailer side. The system can be fully automated, or it can be operated by a human using a controller.

In an example the trailer side coupling head is in a fixed X axis (horizontal axis) location. Variation in trailer position relative to the tractor creates a volume of possible locations in space for the trailer coupler location relative to the tractor. The largest dimension of this volume is along the Z axis, second largest dimension is along the Y axis, the third is along the X axis. This information can be used to constrain the design of the auto-coupling system, to lower its complexity and cost.

The range of positions of a trailer relative to the tractor that is pulling the trailer also defines a volume of space between the tractor and trailer where auto-coupling system structures cannot be located (because they could be impacted by the trailer as it rotates relative to the tractor). A tractor side auto-coupling assembly must be located outside of this "keep out" volume, while still being able to reach the entire volume of possible locations in space of the trailer side coupler relative to the tractor. Off the shelf six DOF robotic arms may not be able to reach all required locations if they are located so that they fit outside the keep out volume when folded out of the way. In an example a folding arm assembly is located (in its retracted state) against or close to the back of the tractor. The arm is configured to extend sufficiently to reach the front of the trailer where the trailer side coupling assembly is located.

A two DOF arm (accommodating actively controlled Z axis extension and passive Y axis rotation) has fewer active components to package, reducing its footprint. In an example Z axis translation is accomplished using folding arm sections, thus maximizing reach for given footprint/volume of the retracted arm. The arm can use four-bar links and a traveling motor. The motor can use a worm drive that is not back drivable. The Y axis rotation DOF can be incorporated in the arm, or in the tractor side coupling head or coupling head carrier. In another example Z axis translation of the tractor coupling head can be accomplished with a different design of a linear mover, such as a rail-based system where the tractor coupling head or its carrier is moved along a horizontal rail.

In an example the tractor side exhibits three DOF, which can include Z axis translation, Y axis rotation, and Y axis translation. The Y axis translation DOF can be accomplished with an active linear actuator or passive springs/flexures (which can be used if the range of required Y axis displacement is reduced). Y axis rotational DOF can be incorporated in the arm that carries the tractor coupling head. In an example a torque threshold must be exceeded before rotation is allowed; this keeps the tractor coupling head from flopping around when moving in free space prior to contact with trailer side coupler. Breakaway can be accomplished with a passive mechanical system such as with a separate linkage and spring-loaded ball, or concentric ring with detents.

In an example the tractor coupling head carrier has passive alignment features. The tractor coupling head carrier has a slot to capture a vertical bar of the trailer coupling head. When there is misalignment in the lateral (X) dimension, a torque is applied that breaks away the tractor side in Y axis rotation. This misalignment can occur when trailer is at an angle relative to tractor. In an example the passive alignment features are Y axis and X axis V-shaped locating ramps that guide passive alignment features on the trailer side coupling head. Y axis and X axis locating ramps guide vertical and horizontal alignment shafts on the trailer side coupling head. In an example the Y axis guide ramps are asymmetrical. In an example the alignment is biased so the horizontal alignment shaft of the trailer coupling head impacts the larger of the Y axis ramps. The Y axis ramps funnel the horizontal alignment shaft on trailer coupling head into a slot on tractor coupling head carrier that positively locates the horizontal alignment shaft. The X axis ramps on the tractor coupling head carrier funnel a vertical alignment shaft on the trailer coupling head into a second slot on tractor coupling head carrier to positively locate the vertical alignment shaft. Misalignment in the X axis applies torque to the trailer coupling head when its vertical alignment shaft contacts an X axis ramp of the tractor coupling head carrier. When a preset torque threshold is exceeded, a carrier within the trailer coupling head can break away and allow Y axis rotation to occur. Y axis ramp may be single sided rather than V shaped. A latching linkage that is part of the tractor coupling head carrier latches onto the horizontal alignment shaft of the trailer coupling head to hold the air couplings together under clamping pressure. When the tractor coupling head clamps onto the horizontal alignment shaft, it is released from the tractor coupling head carrier and stays in place when tractor coupling head carrier retracts. When the tractor coupling head carrier re-engages with the tractor coupling head that is clamped to the trailer coupling head, the clamp is released and the tractor coupling head is fixed to the tractor coupling head carrier, so the tractor coupling head is withdrawn when the tractor arm retracts.

A trailer coupling assembly includes structures for mounting the assembly to a trailer. The trailer coupling assembly can include a frame that is configured to be removably fixed to the trailer, and a coupling head carried by the frame. The coupling head can include X and Y alignment shafts. The trailer side coupling assembly may include an RFID tag or other identifying information, which may be permanently or removable attached to various portions of the trailer coupling assembly. The coupling head may be fixed to the frame or may be detachable from the frame for easier storage. In an example the frame removably couples to the trailer using magnets. The magnets can be coupled to the frame using structures that accommodate variation in the trailer surface geometry. The magnets can be compliantly coupled to the frame or pivotably coupled to the frame. The magnets may be configured to slide or otherwise move a distance along the frame. The magnets may be concentrated towards the front of the frame where forces from coupling with the tractor coupling head are concentrated. Magnets may fix the frame to bottom of the trailer and/or to the front of trailer and/or to one or more sides of the trailer. In an example the frame can be removed using a cam or pry lever built into the frame to separate the frame from the trailer. In an example the frame has locating features that can position the frame relative to a side of the trailer. The locating features can also reference the front of the trailer. In an example the coupling assembly incorporates a mounting bracket that is permanently affixed to a trailer. The mounting bracket is simplified so it is very inexpensive. The mounting bracket can be screwed, bolted, welded, or otherwise permanently affixed to the trailer. The mounting bracket incorporates features that allow a coupling head to be coupled to the bracket. The carriage assembly can incorporate mating features designed to be snapped into and out of the bracket, or be otherwise coupled to the bracket, without use of separate fasteners—the bracket and carriage assemblies are designed with complimentary and proprietary mounting features and structures. The bracket may incorporate other non-proprietary features to allow other structures to be coupled to the bracket. The other features may include holes, slots, tabs, and the like, which can be standardized coupling features. The other features allow trailer side couplers from other manufacturers to be coupled to a standardized mounting bracket. The entire coupling assembly can be permanently affixed to the trailer.

In an example the trailer coupling assembly includes a carriage assembly that includes a coupling head mounted to a carriage. The carriage incorporates one DOF of movement—Y axis translation. Rollers ride within an extrusion track. The carriage is sprung in a positive Y axis direction by a constant force spring against an adjustable hard stop that can be used to set a default position, which reduces tolerance in default position. A constant force spring is desirable because the amount of Y displacement would cause forces applied from a linear spring to be larger than desirable near the ends of travel. A constant force spring can be designed to minimize forces in negative Y direction to reduce require motor torque on trailer side motor, and also reduce jamming. In one example, Y axis translation of up to 10 inches is accommodated. In one example, Y axis translation up to 10" and Y axis rotation is accommodated. In one example, Y axis translation up to 3" and Y axis rotation is accommodated, typically for use in a system with fifth wheel height servo control. A smaller range of Y axis translation can be accomplished using flexures or springs rather than a carriage or other structure that can translate vertically.

In an example the trailer coupling head is mounted to the carriage with one relative DOF—Y axis rotation. The trailer coupling head may have a flat plate with a pair of standard glad hand seals that mate with a flat surface of the tractor coupling head, which also incorporates a pair of glad hand seals. The plates are pressed together and held in place under pressure with a clamp link incorporated on the tractor coupling head carrier that clamps to the horizontal alignment shaft of the trailer coupling head. The clamp could affix to other structures such as the vertical alignment shaft or other features on the trailer coupling head. The trailer coupling head is flexibly coupled to air and electrical connectors on the trailer.

The trailer coupling head can also incorporate standard glad hand couplers that allow tractors without automated couplers to be coupled to the trailer. In this example a pressure driven diverting valve applies pressure to the appropriate connection. Connection to standard glad hands actuates a valve that seals off the automated coupler plate connections. Connection to the automated coupling plate connections actuates a valve that shuts off the standard glad hands.

All examples and features mentioned below can be combined in any technically possible way.

In one aspect, a system for automatically coupling at least one of an air line or an electrical line of a tractor to a trailer that is configured to be pulled by the tractor includes a moveable arm mounted to the tractor and configured to exhibit at least one degree of freedom (DOF) of motion relative to the tractor, wherein the moveable arm carries at least one of an air line connector or an electrical connector and a trailer coupling head mounted to the trailer and that carries at least one of an air line connector or an electrical connector that are configured to be connected to the at least one of an air line connector or an electrical connector of the tractor. The trailer coupling head can be moved in at least a vertical DOF relative to the ground by the automatic coupling system.

Some examples include one of the above and/or below features, or any combination thereof. In an example the moveable arm is configured to exhibit two DOF and the trailer coupling head is configured to exhibit two DOF. In some examples the moveable arm is configured to exhibit a translational DOF in a longitudinal direction and a rotational DOF about a vertical axis that is orthogonal to the longitudinal direction. In an example the vertical axis rotation is locked until a threshold torque load is exceeded. In an example a controller is configured to control the moveable arm translational DOF, and wherein the moveable arm vertical axis rotational DOF is passive. In an example the moveable arm comprises a tractor coupling head, wherein the rotational DOF of the moveable arm is accomplished by providing for passive motion of the tractor coupling head.

Some examples include one of the above and/or below features, or any combination thereof. In an example the trailer coupling head is configured to exhibit a translational DOF in a vertical direction and a rotational DOF about a vertical axis. In an example the trailer coupling head DOF are passive. In an example the moveable arm is configured to exhibit a translational DOF in a longitudinal direction that is accomplished at least in part using folding arm sections. In an example the folding arm sections comprise four-bar links. In an example a traveling motor is mounted between arm sections and is configured to translate the arm in the longitudinal direction, wherein the motor translates when the arm is translated in the longitudinal direction.

Some examples include one of the above and/or below features, or any combination thereof. In an example the moveable arm comprises a tractor coupling head that is removably mounted at a distal end of the arm and is configured to be removably coupled to the trailer coupling head. In an example a first set of sensors is configured to detect when the tractor coupling head is mounted at the distal end of the arm, and a second set of sensors is configured to detect when the tractor coupling head is coupled to the trailer coupling head. In an example a trailer coupling assembly is configured to be removably mounted to the trailer and comprises the trailer coupling head. In an example the trailer coupling head comprises horizontal and vertical alignment rods for guiding a tractor coupling head mounted to an end of the moveable arm into alignment with the trailer coupling head.

Some examples include one of the above and/or below features, or any combination thereof. In an example the trailer coupling head is carried by a frame that is configured to be removably coupled to the trailer with magnets. In an example a controller is configured to control the height of a fifth wheel of the tractor, to provide the trailer coupling head vertical DOF relative to the ground. In an example the moveable arm is configured to exhibit a translational DOF in a longitudinal direction, a rotational DOF about a vertical axis that is orthogonal to the longitudinal direction, and a rotational DOF about a horizontal axis that is orthogonal to the longitudinal direction and the vertical axis. In an example the moveable arm comprises a tractor coupling head that is removably coupled to a tractor coupling head carrier. In an example the trailer coupling head comprises alignment features that are configured to engage with the tractor coupling head carrier, to align the tractor coupling head with the trailer coupling head.

In another aspect a method for automatically coupling at least one of an air line or an electrical line of a tractor to a trailer that is configured to be pulled by the tractor includes mounting a trailer coupling head to the trailer, wherein the trailer coupling head carries at least one of an air line connector or an electrical connector that are configured to be connected to the at least one of an air line connector or an electrical connector of the tractor and using an automatic coupling system to translate a moveable arm that is mounted to the tractor toward the trailer, wherein the movable arm is configured to exhibit at least one degree of freedom (DOF) of motion relative to the tractor, wherein the moveable arm carries at least one of an air line connector or an electrical connector. The trailer coupling head can be moved in at least a vertical DOF relative to the ground by the automatic coupling system.

In another aspect a trailer coupling assembly for coupling at least one of an air line or an electrical line of a tractor to a trailer that is configured to be pulled by the tractor includes a frame that is configured to be mounted to the trailer and a trailer coupling head that is carried by the frame, wherein the trailer coupling head comprises at least one of a connector for an air line or a connector for an electrical line that are configured to be connected to at least one of a connector for an air line or a connector for an electrical line of the tractor, and at least one alignment rail for facilitating passive rotational alignment about a first axis between the trailer coupling head and a tractor coupling head.

Some examples include one of the above and/or below features, or any combination thereof. In an example the alignment rail folds up for storage. In an example the first axis is a vertical axis. In an example the alignment rail comprises a structure that references the front, bottom edge of the trailer. In an example the trailer coupling head comprises an opening for receiving the tractor coupling head. In an example the trailer coupling head comprises at least one air line connector and at least one electrical connector. In an example the trailer coupling head comprises a pair of air line connectors and at least one electrical connector. In an example the at least one electrical connector is located between the pair of air line connectors.

Some examples include one of the above and/or below features, or any combination thereof. In an example the trailer coupling head comprises alignment features, wherein when the tractor coupling head engages with the trailer coupling head, the alignment features engage with the tractor coupling head to align the tractor coupling head with the trailer coupling head. In an example an alignment structure coupled to the tractor coupling head is constructed and arranged to engage with the alignment rail. In an example when the alignment structure engages with the alignment rail, a torque is applied about the first axis to rotate the tractor coupling head into alignment with the trailer coupling head. In an example the tractor coupling head is constructed and arranged to be removably clamped in place to the trailer coupling head. In an example a latch and a solenoid that is configured to move the latch allow the tractor coupling head to either remain with trailer coupling head or retract from the trailer coupling head.

Some examples include one of the above and/or below features, or any combination thereof. In an example the trailer coupling head is configured to move in at least one DOF relative to the frame. In an example the at least one DOF is translation along the first axis. In an example the at least one DOF is rotation about the first axis. In an example the trailer coupling head comprises first and second alignment rails, wherein the second alignment rail is positioned to be orthogonal to the first alignment rail. In an example the second alignment rail facilitates rotational alignment about a second axis, between the trailer coupling head and a tractor coupling head. In an example the first axis is vertical, wherein the trailer coupling head is configured to ride along a vertically oriented track that is coupled to the frame. In an example the assembly further comprises a spring, wherein the trailer coupling head is coupled to the spring to bias the trailer coupling head in a neutral position. In an example the frame is removably coupled to the trailer with magnets.

BRIEF DESCRIPTION OF THE DRAWINGS

FIG. 5A is a side view of the tractor coupling head carrier and the trailer coupling head, while

FIG. 19A is a more detailed view of the tractor coupling head close to engagement with the trailer coupling head and FIG. 19B shows them engaged.

DETAILED DESCRIPTION

In the present automatic tractor trailer coupling system and method, the tractor coupling head is movable toward and away from the tractor, and the trailer coupling head is carried by the trailer. The degrees of freedom (DOF) of motion needed to bring the coupling heads into proper alignment and contact to accomplish the air/electrical coupling are provided in part on the tractor side and in part on the trailer side. At least the tractor side has active motion control. By allowing motion in one or more DOF on the trailer side, the complexity of the tractor side assembly is reduced. In one example the trailer coupling head is constructed and arranged such that it is able to move passively in a vertical DOF relative to the ground. In another example the trailer coupling head vertical movement DOF is accomplished by control of the height of the trailer via automated control of the tractor boom that controls the height of the tractor's fifth wheel coupling; in this case there may be a very small passive vertical DOF of the trailer coupling head to accommodate for slight vertical misalignment after fifth wheel height control.

Figure 1:
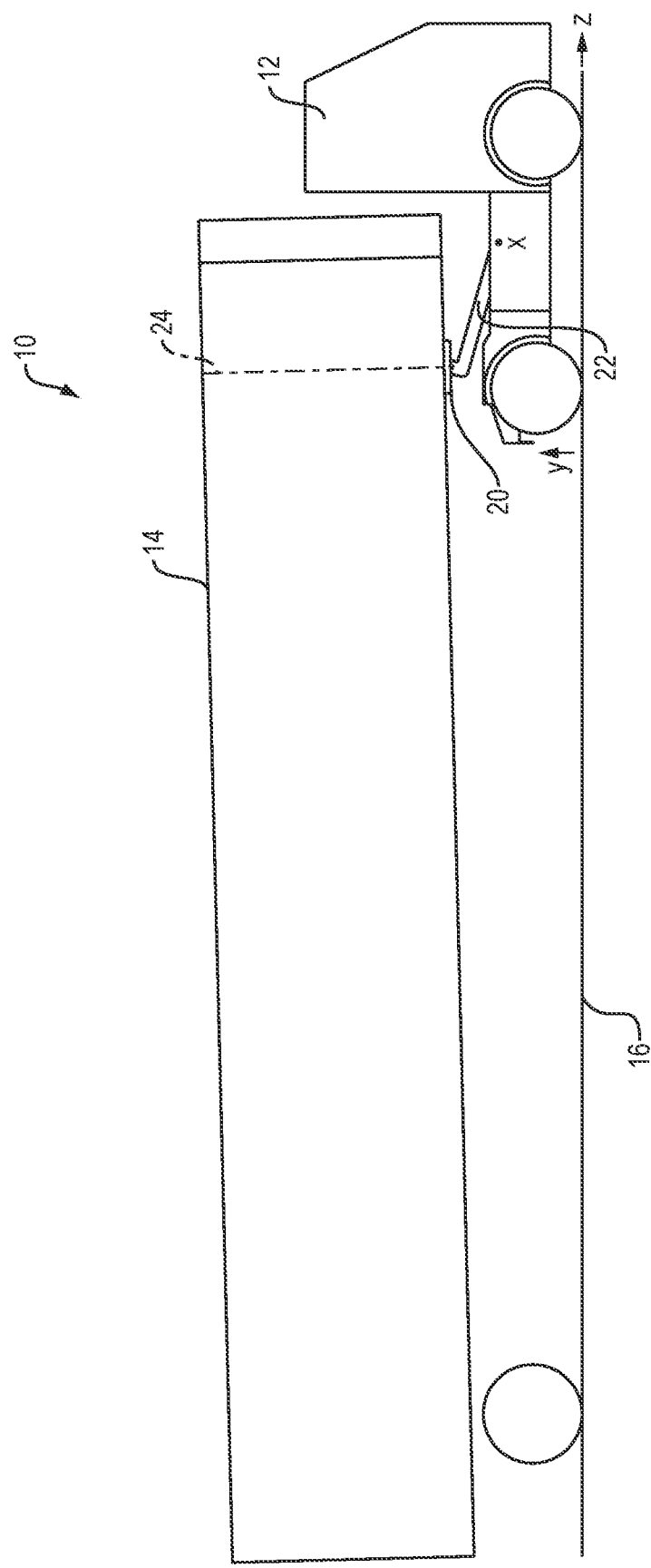
FIG. 1 is a side view of a tractor-trailer combination.

FIG. 1 is side view of a tractor-trailer combination 10, illustrating tractor 12 coupled to and ready to pull trailer 14 along ground 16. Coupling is accomplished by coupling of the tractor's fifth wheel coupling 20 to the trailer kingpin (not shown). This establishes a trailer rotational axis 24. The height of fifth wheel 20 can be controlled by controlling the angle of hydraulic boom 22.

Figure 2:
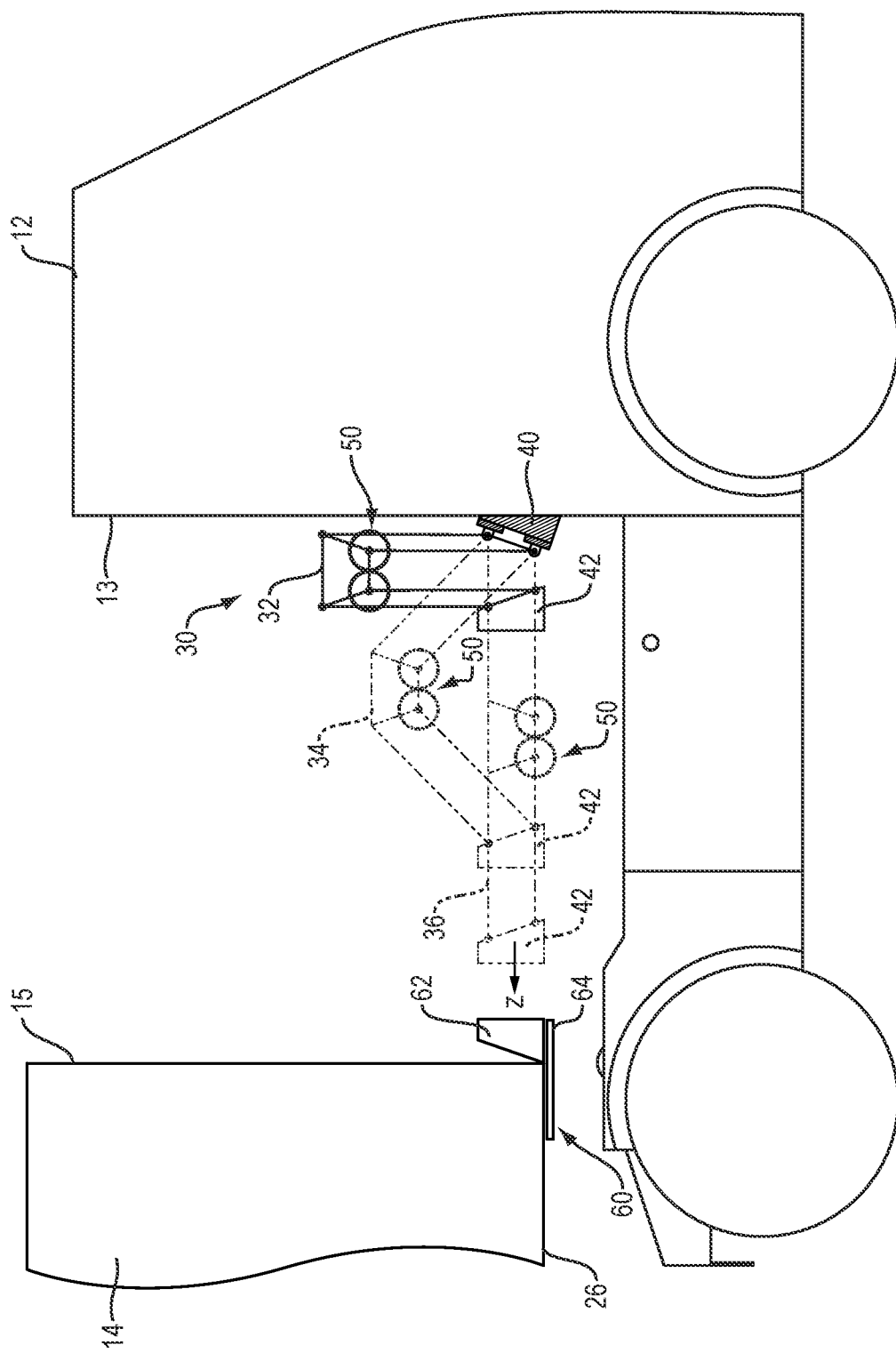
FIG. 2 is a schematic view of aspects of a system for automatically coupling air lines and electrical lines from a tractor to a trailer.
Figure 3A:
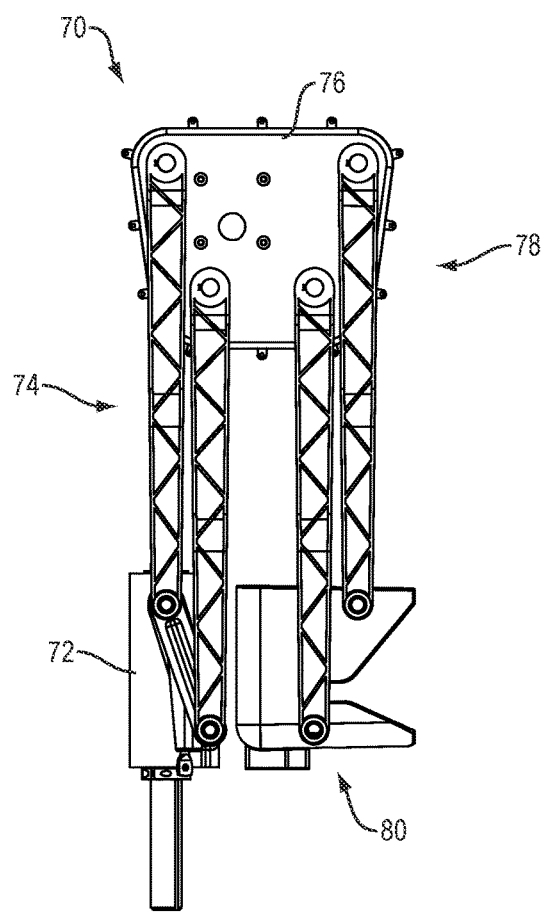
FIG. 3A illustrates the arm of the system of FIG. 2, in the folded or stowed position.
Figure 3B:
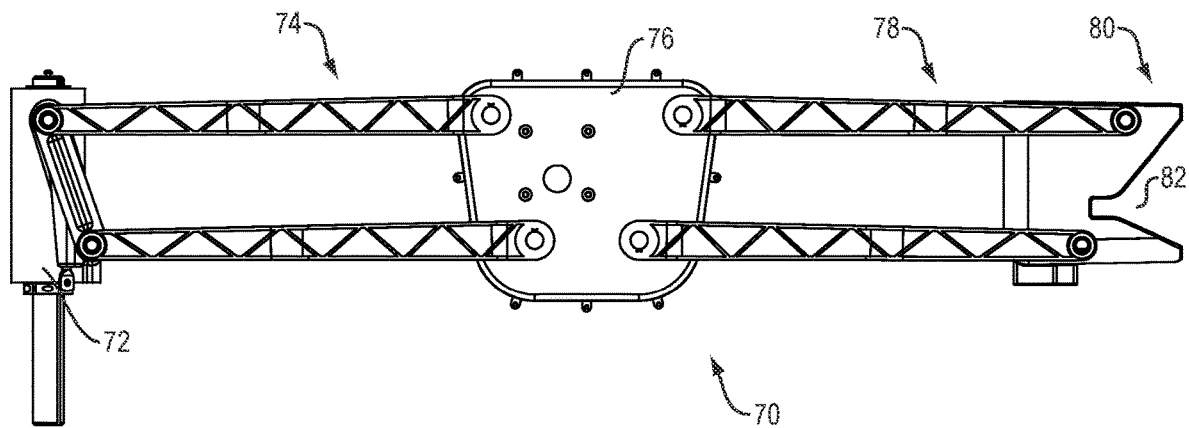
FIG. 3B shows the arm fully extended toward the trailer, FIG. 3C includes the tractor and trailer.
Figure 3C:
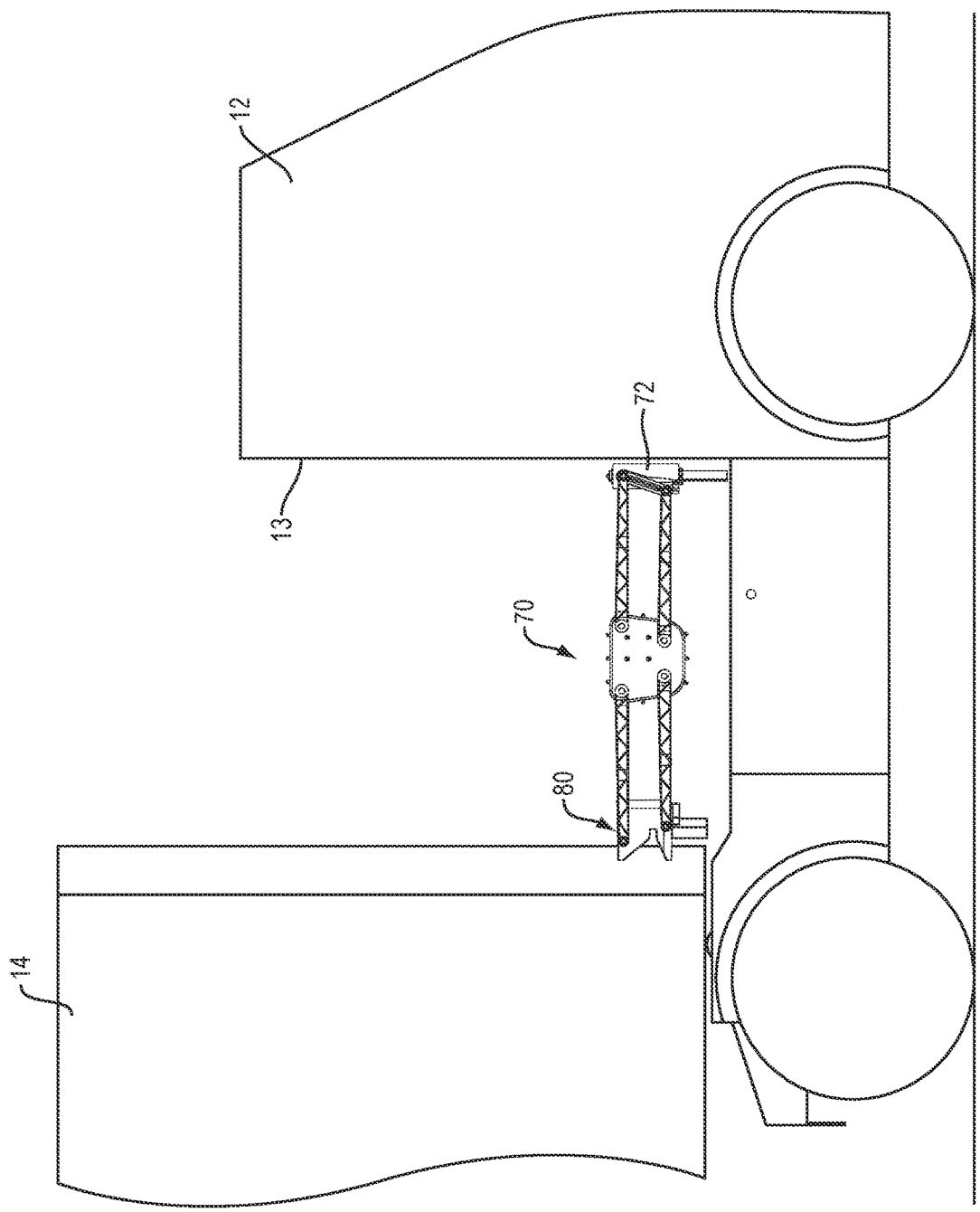
FIG. 3D illustrates a pivot for the arm.
Figure 3D:
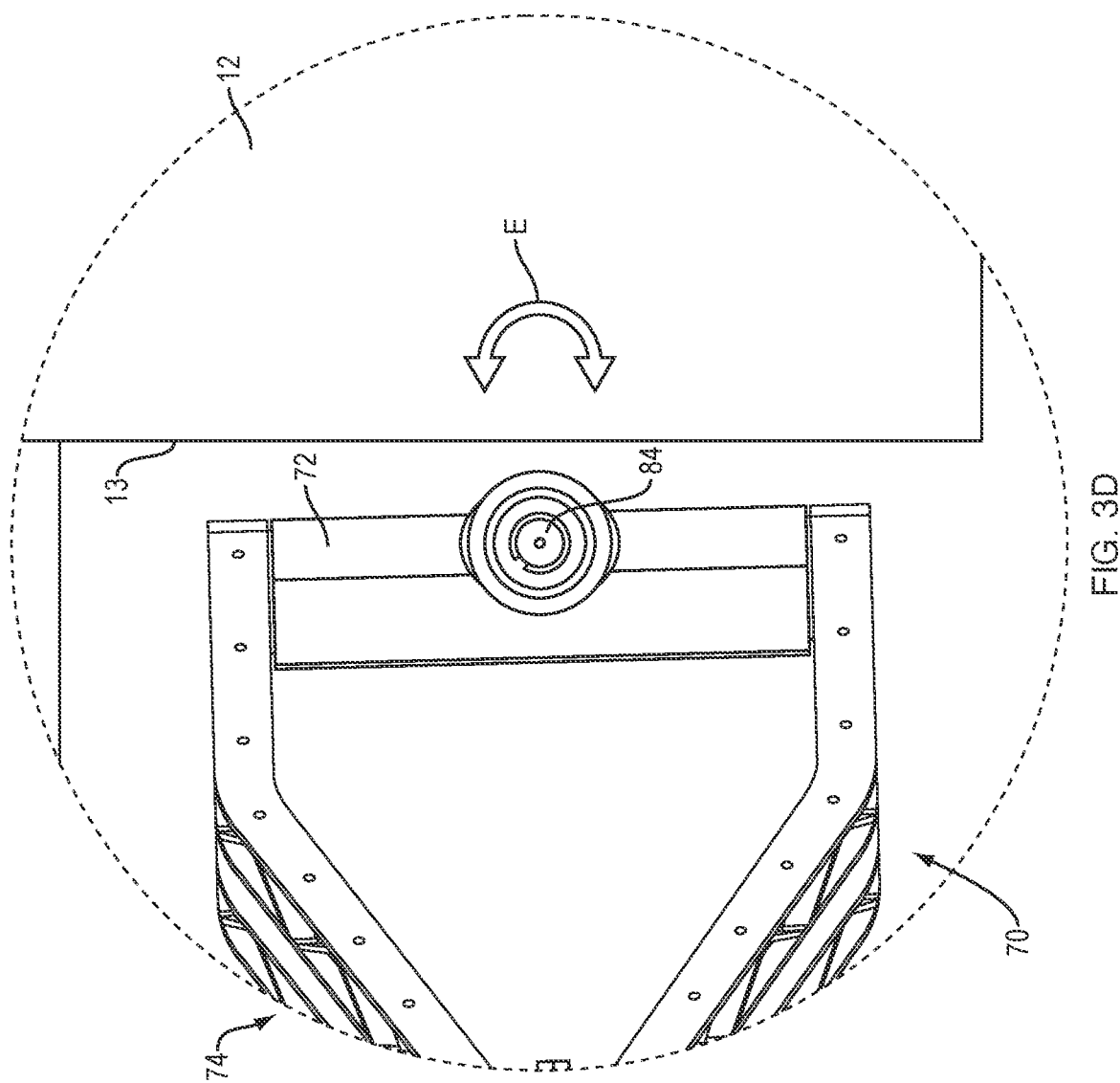

In the subject system and method the tractor coupling head is moved toward and away from the trailer (along a longitudinal Z axis). FIG. 2 is a schematic view of aspects of a system for automatically coupling air lines and electrical lines from a tractor to a trailer. Movable arm 30 is carried at the back 13 of tractor 12, via arm support 40. Arm 30 is illustrated in its fully stowed (retracted) position 32, a partially extended position 34, and a fully extended position 36. Arm 30 carries tractor coupling head 42 (shown schematically) that is configured to engage with and be coupled to trailer coupling head 62 (shown schematically). The trailer coupling assembly 60 includes trailer coupling head 62 that is carried by frame 64. Frame 64 is coupled to trailer 14 such that the position of the trailer coupling head is within a known volume relative to the tractor when the tractor and trailer are coupled. In some examples frame 64 is carried at the bottom, side, and/or front 15 edge of trailer 14 and configured to place coupling head 62 just at or in front of the front 15 and at or close to the bottom 26. As explained in more detail below, since not all trailers are the same, this known volume positioning can be accomplished at least in part by referencing the trailer coupling head to the front edge and/or a side of the trailer using an appropriately-designed frame that carries the head.

In the examples illustrated in FIG. 2 and in FIGS. 3A-3D, the arm is constructed and arranged to move the coupling head along a straight line toward and away from the trailer. These motions can be accomplished using two sets of four-bar links that are connected and synchronized by a traveling motor and an appropriate gear set, both schematically illustrated as 50, FIG. 2. In the example of FIGS. 3A-3D coupling 72 is carried by or coupled to the tractor. Arm 70 is carried by coupling 72. First four-bar linkage 74 is connected between coupling 72 and central support 76 that also carries the motor and gear set. Second four-bar linkage 78 is connected between support 76 and tractor coupling head carrier 80. As the motor (not shown) causes the two four-bar links to pivot to allow the arm to retract and extend, coupling head carrier 80, with opening 82 that is used to accept the trailer coupling head, is moved along a straight line.

A challenge of designing a device that will make a connection between a tractor and trailer is achieving the necessary range of motion to accommodate the large uncertainty in the z direction location of the trailer coupling head while still having a small enough retracted dimension to remain outside of the "keep out volume" while towing the trailer. The selected mechanism has a large range of motion and also a small retracted dimension. A worm drive is a good candidate transmission to drive this mechanism since it can create very high gear ratios and is not back-drivable. A back-drivable transmission could be affected by sudden jolts and gravity while a transmission that is not back-drivable maintains its position unless otherwise commanded. The tractor coupling head carrier is connected to this link and experiences pure translation in the z direction. If a worm drive is used, a relatively low power motor could be used to drive this mechanism since speed of activation is not critical. Utilizing this double four-bar linkage, the arm extends out in a straight line path to the trailer coupling head. This greatly minimizes the complexity of the system. Additionally, unlike other linear actuator systems, this one folds into a small package, with an extended to retracted aspect ratio of about 4:1.

In an example the arm has at least two DOF of motion—translation along the Z (longitudinal) axis and rotation about the Y (vertical) axis. In another example the arm also has a Y axis translation DOF. The arm DOF are a means to help position the tractor coupling head such that it properly interfaces with the trailer coupling head. Accordingly, the arm DOF can be accomplished anywhere in the tractor coupling assembly, including in the arm itself, where the arm is coupled to the tractor, in the tractor coupling head carrier, in the tractor coupling head, and/or by adjusting the height of the trailer itself. In the example illustrated in FIG. 3D the arm Y axis rotational DOF is accomplished with a pivot assembly 84 where the arm end coupling 72 is coupled to tractor 12 rear portion 13. Pivot assembly 84 may be configured to allow for rotation of the arm about the Y axis only after a threshold torque is reached. This locks the arm (and thus the tractor coupling head) from rotation around the Y axis unless a certain torque threshold is reached, at which point the arm and its tractor coupling head will be able to passively rotate about the Y axis. This rotation helps the y-z plane of the tractor and trailer coupling heads to come into alignment. In an example the breakaway torque is desirably less than the length of the extended arm times the force required to slide the magnets that couple the frame to the trailer, which is dependent in part on the types and quantity of magnets and their positions. As a rough estimate the breakaway torque is in the range of 20-40 Nm at the rotation point, which is generally sufficient to keep the arm from rotating due to outside forces such as gravity, wind, and vibrations, but easily overcome by the coupling of the trailer coupling head without moving the frame. The releasable locking pivot can be designed in any conventional mechanical manner, such as using cam plates and a spring in the bearing.

Figure 4A:
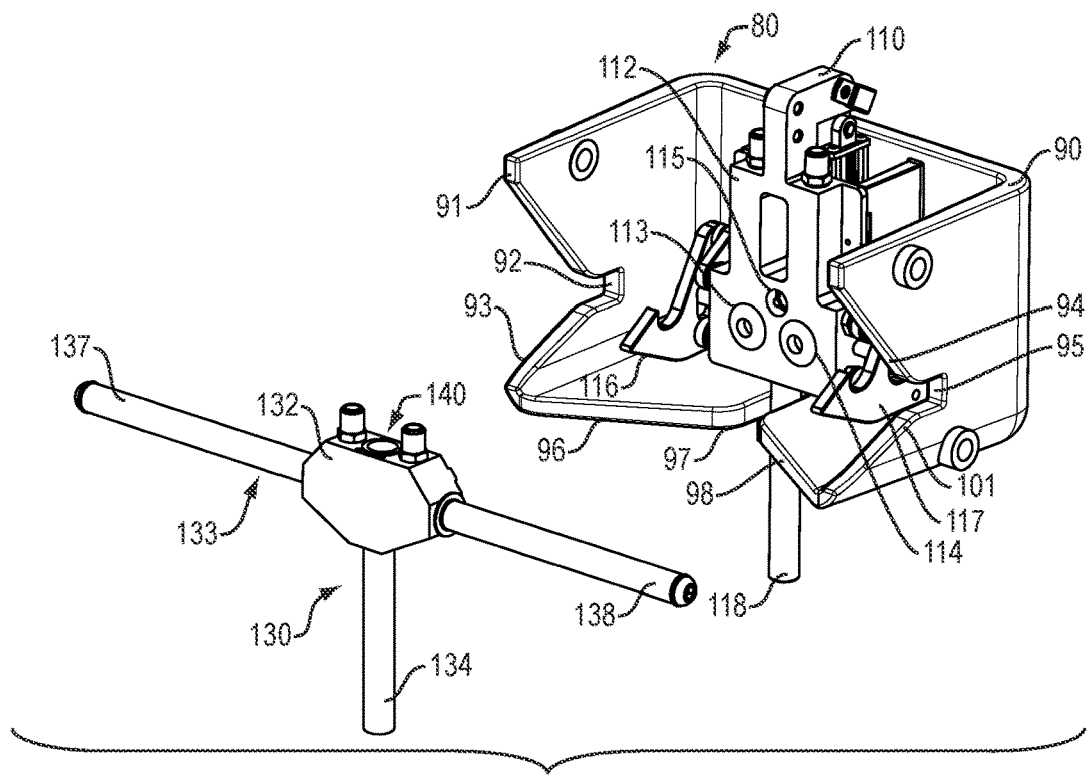
FIG. 4A illustrates an example of a tractor coupling head and coupling head carrier about to mate with a trailer coupling head.
Figure 4B:
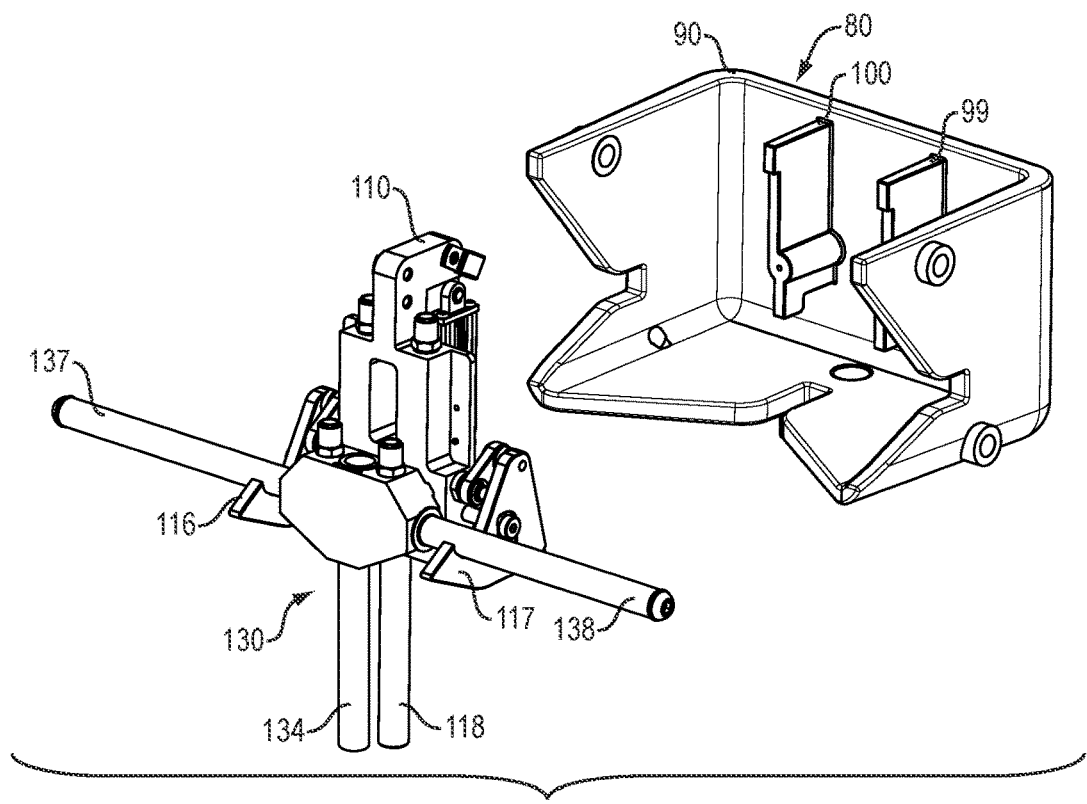
FIG. 4B shows the two coupling heads mated.

FIG. 4A illustrates an example of a tractor coupling head and coupling head carrier about to mate with a trailer coupling head, and FIG. 4B shows the two coupling heads mated. In an example, in order to align the tractor and trailer auto-coupling heads the tractor coupling head is held inside of a carrier which has "V" shaped ramp features on both sides and on at least one of the top and bottom. The trailer coupling head has alignment shafts protruding from the sides in the x (lateral) and y (vertical) directions. The tractor coupling head carrier will be driven in the z direction. As the tractor coupling head carrier is advanced toward the trailer coupling head in the negative z direction (toward the trailer), the ramps will come into contact with the alignment shafts of the tractor coupling head. The trailer coupling head is arranged to have one or two passive DOF of motion. One DOF is translational along the Y axis. The second, if present, is rotation about the Y axis. As the tractor coupling head carrier continues to advance the trailer coupling head will be passively translated and/or rotated about the Y axis to align with the tractor coupling head carrier.

Tractor coupling assembly 80 includes coupling head carrier 90 and coupling head 110 that is configured to mate to trailer coupling head 130. Vertical bar 118 of coupling head 110 is used to reference coupling head 110 into slot 97. As depicted, in this non-limiting example tractor coupling head carrier 90 has double-sided ramps on the left and right and receiving slots where the ramps meet. Ramps 91 and 93 on the right side are configured to engage with horizontal alignment shaft 137 of trailer coupling head 130 and guide it into slot 92. Ramps 94 and 101 on the left side are configured to engage with horizontal alignment shaft 138 of trailer coupling head 130 and guide it into slot 95. The bottom ramps 96 and 98 that lead to slot 97 are configured to engage with vertical alignment shaft 134 of trailer coupling head 130 and guide it into slot 97. Trailer coupling head 130 includes body 132, locating feature set 133 comprising alignment shafts 134, 137, and 138, air and electrical fittings 140 that convey air and electrical signals that are received from the tractor through body 132 and to the trailer, via flexible hoses/lines (not shown), and air seals and an electrical coupling (not shown) on the face of body 132 that faces the tractor coupling head.

Both the tractor coupling head and the trailer coupling head have outer faces that are configured to mate and be coupled together, in order to couple one or two air lines and/or electrical lines from the tractor to the trailer. FIG. 4A depicts face 112 of coupling head 110, on which are located air seals 113 and 114 and electrical fixture or coupling 115. Air line coupling can be accomplished with seals on the faces of the coupling heads that meet and are compressed when the heads are clamped together, to provide an air-tight seal. In an example the seals are the same types that are used in the standard, manually-coupled glad-hand seals used in the trucking industry. Electrical coupling can be accomplished with a plug on one face and a mating receptacle on the other face that make electrical contact when the heads are clamped together. In an example pivoting latching arms 116 and 117 of coupling head 110 are used to clamp onto shafts 137 and 138, to hold the two heads together with the air seals and electrical couplers mated. As explained below, when the heads are latched together head 110 is released from supports 99 and 100 of carrier 90, and carrier 90 is withdrawn by the arm into the stowed position.

Figure 5A:
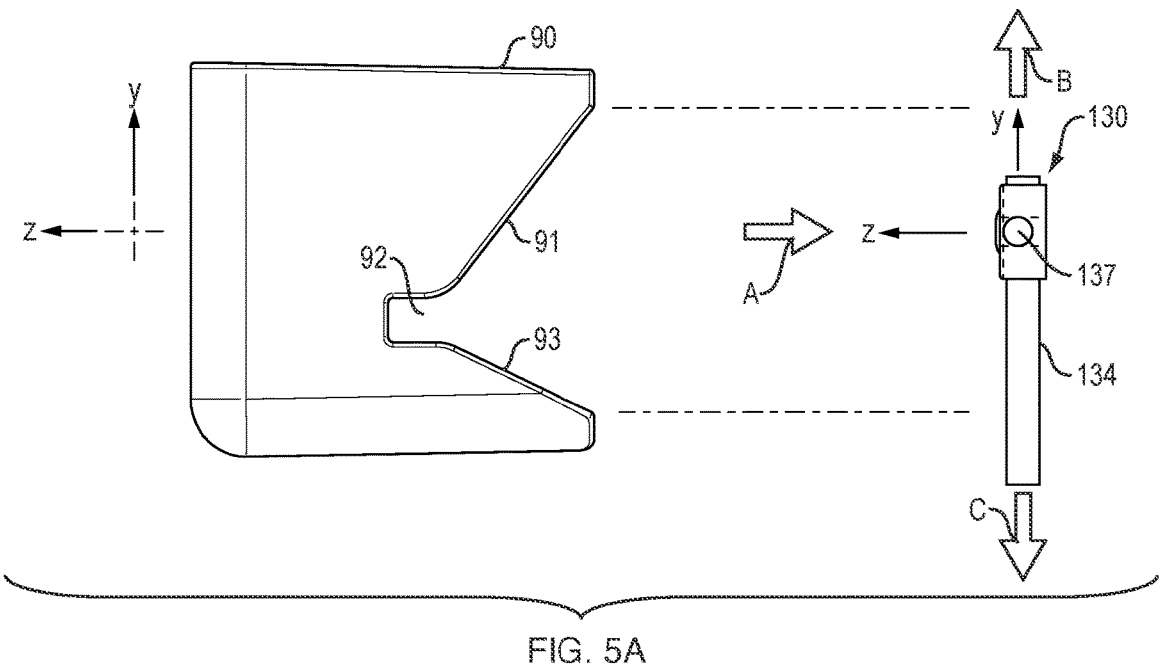
Figure 5B:
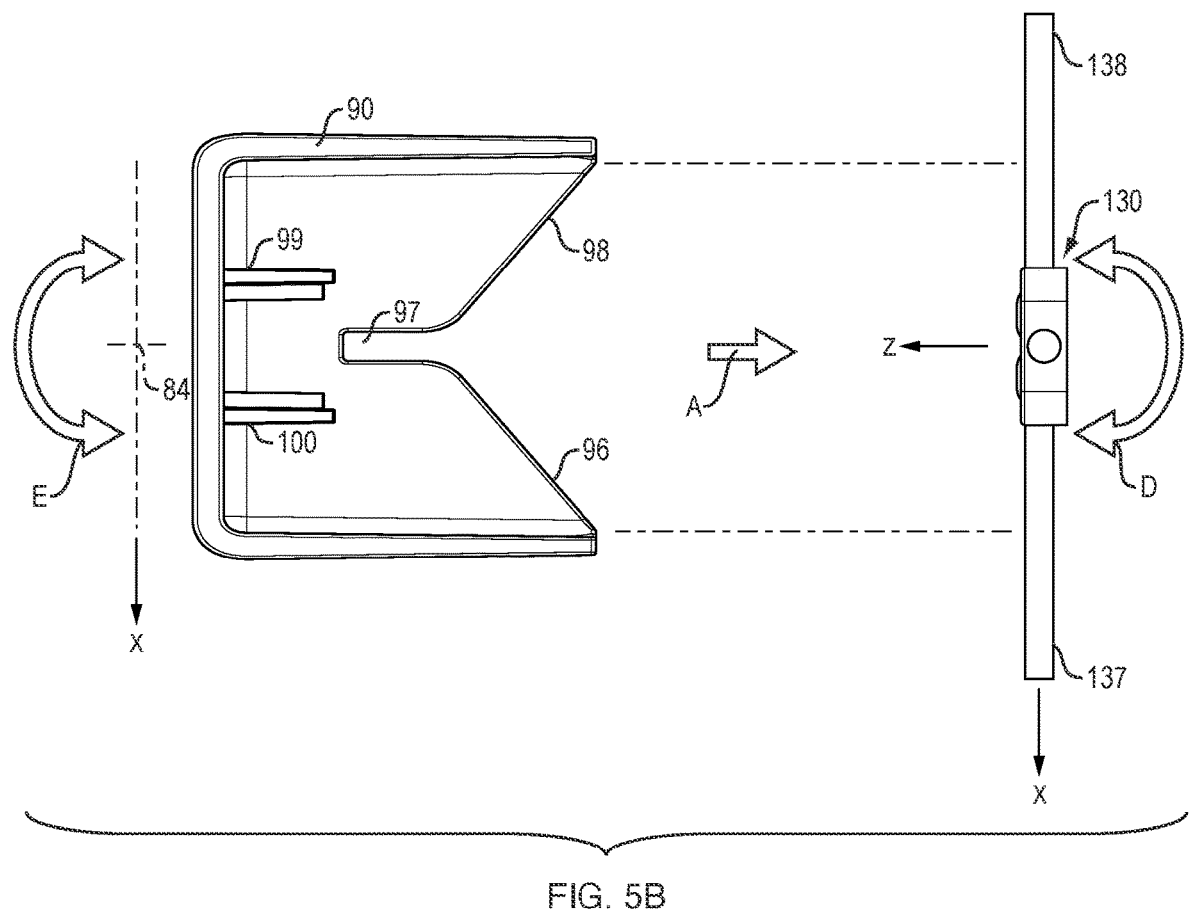
FIG. 5B is a top view thereof.
Figure 5D:
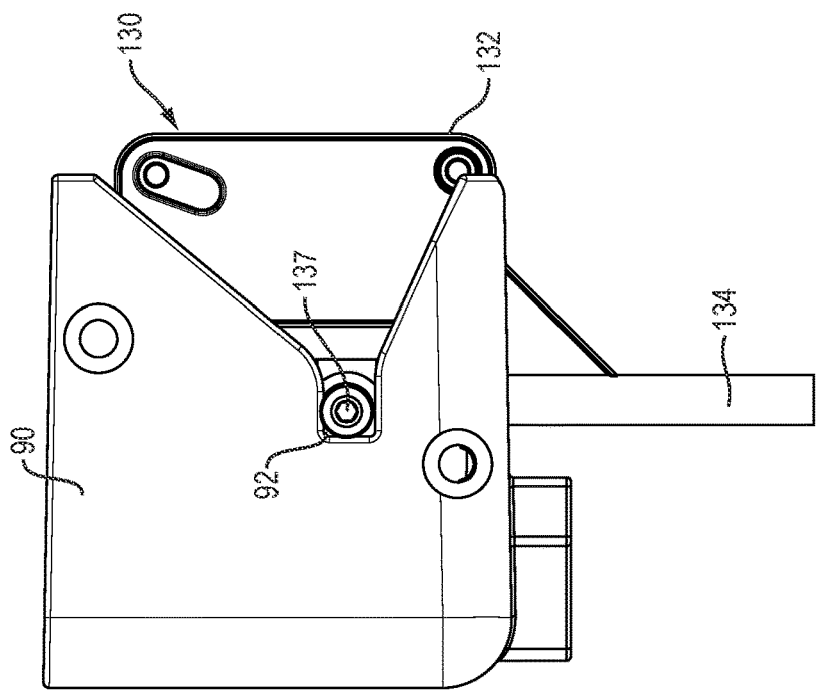
FIG. 5D shows the two fully engaged.
Figure 5C:
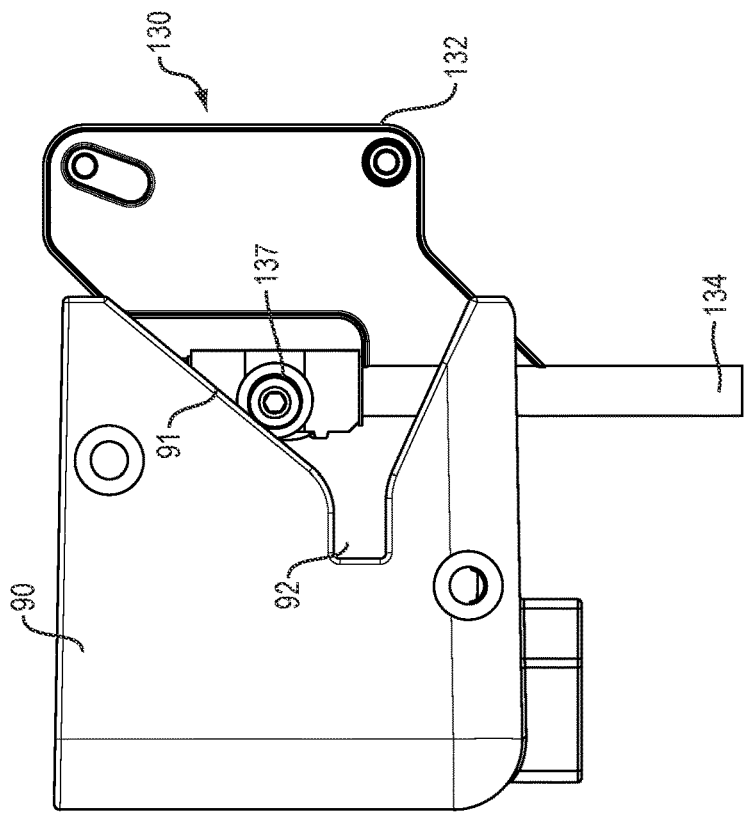
FIG. 5C illustrates the tractor coupling head carrier coming into contact with the trailer coupling head.

FIG. 5A is a side view of the tractor coupling head carrier and the trailer coupling head, while FIG. 5B is a top view thereof. FIG. 5C illustrates the tractor coupling head carrier coming into contact with the trailer coupling head, and FIG. 5D shows the two fully engaged. In this example the allowed motions are indicated by arrows A, B, C, D, and E. In an example all motions except motion "A" (translation of the tractor coupling head carrier) are passive. The vertical height of parked trailers and therefore their coupling heads varies, as it corresponds to the extension of the landing gear 'legs' that the front half of the trailer rests on. The landing gear or legs of the trailer are set by humans. In the case of a truck yard, entering trailers are typically brought into the yard by over the road OTR trucks, which come in a variety of heights. This can range from about 0.5 m below the default height of a yard tractor's fifth wheel, to about 0.3 m above it. In the case of the former, when the yard tractor goes to connect to a trailer, it usually features ramps on the back that will pick up the trailer and bring it to the height of the tractor's fifth wheel. In the case of the latter, the operator must raise the fifth wheel via the boom to meet the height of the trailer. After either is accomplished, the yard tractor will continue backing into the trailer until the kingpin is captured by the fifth wheel. After that has occurred, the subject auto-coupling operation will be performed. With the lower trailers, the height of the trailer coupling head is already the same as the height of the tractor coupling head. With the higher trailers, the asymmetric ramp of the tractor coupling head carrier will pull down the elevated trailer coupling head and center it, then connect to it. After the auto-coupling cycle has been completed, the truck operator will bring the fifth wheel to its maximum height, which will pull the legs of the taller trailers off the ground, and raise the shorter trailers even higher. The tractor is then free to drive away with the trailer without dragging the trailer legs on the ground.

When bringing the trailer coupling head down to the correct docking height, the vertical shaft used for X-axis locating is brought down with it. See FIG. 5C for shaft 137 contacting ramp 91 and the trailer coupling head 130 being brought down by the ramp, to the centered position defined by slot 92, FIG. 5D. If brought too far, the pin may interfere with semi-truck wheels or frame. Accordingly, it is best if it is offset by its length above the plane of the trailer underside. It should maintain this raised position until it comes into contact with the asymmetric ramp system, at which point it can be brought down for docking and un-docking. It is thus best to bias the trailer coupling head to the top of its vertical range. This can be accomplished via a spring system. However, conventional springs apply an increasing force the more they are compressed or extended, which in turn applies a stronger force to the magnets holding the frame to the trailer underside and causing a 'slingshot' effect when the arm is retracted. To counter this jolt of energy, constant force springs (such as those typically used in self-retracting tape measures) tuned to the gravitational mass of the trailer docking head can be used. These apply a constant amount of force across the entire range of engagement between the asymmetric ramp and docking head, ensuring a smooth and consistent motion between the two.

In this example only one DOF (Z axis DOF of the tractor coupling head) is controlled. Control requires positional feedback. Positional feedback may be accomplished using sensors that detect when the arm is retracted, and when the tractor and trailer coupling heads are engaged. This is one method, where the sensors detect when the arm is at the ends of its required travel and do not need to sense where it is when the arm is at an intermediate location. A more complex sensing system could sense position over the entire range of travel. The angle of the four-bar links could be sensed as a measure of displacement, or lidar could be used to sense absolute distance of the tractor carrier head from the trailer coupling head, or the distance of the carrier head from the arm attachment point to the tractor, or use other methods.

Figure 6:
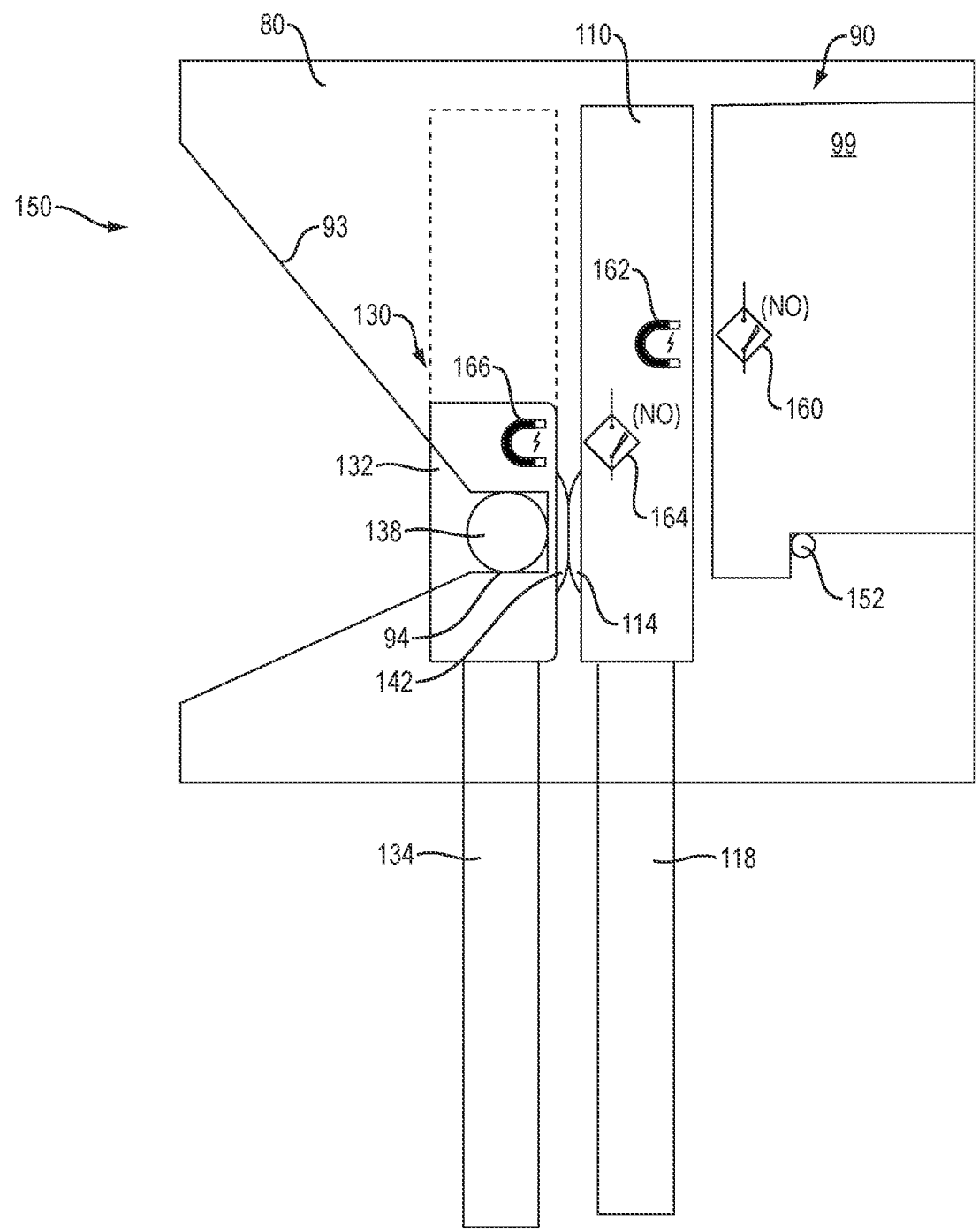
FIG. 6 is a side schematic view of the tractor coupling head and coupling head carrier engaged with the trailer coupling head and illustrating sensors used for active control of the system.

FIG. 6 is a side schematic view of an assembly 150 including the tractor coupling head and coupling head carrier engaged with the trailer coupling head, and illustrating sensors used for active control of the system. Operations of the system and its use of sensors is described in more detail below. In an example there are at least four sensors needed to operate the automatic-coupling system. Sensor 160 is a (normally open) Hall effect sensor carried by tractor coupling head carrier 90 (e.g., by support 99) is used in conjunction with permanent magnet 162 in tractor coupling head 110 to sense when the tractor coupling head is in close proximity to or latched to the tractor coupling head carrier. If the proximity sensor is activated and the tractor/trailer head capture linkage (described below) is in the unlatched position, then the tractor coupling head must be captured inside of the tractor coupling head carrier. Sensor 164 is also a (normally open) Hall effect sensor carried by the tractor coupling head 110 and used in conjunction with permanent magnet 166 carried by the trailer coupling head 130 to sense when the tractor and trailer coupling heads are in close proximity with each other. If this proximity sensor is activated, it means that the system is ready to attempt latching the tractor to trailer coupling heads, or that the heads are already latched. Another sensor (not shown) would be a pressure transducer that senses the air pressure in the tractor air system. After the tractor has been coupled to the trailer through the coupling heads the system will be charged with air pressure. If the pressure in the system drops and remains below a certain threshold, the control system will interpret that as a failed air coupling and will not attempt to tow the trailer. Another sensor (not shown) would be a proximity sensor or limit switch that lets the controls system know that the arm is in the fully retracted position. This sensor will tell the control system when to stop retracting the arm and that it is okay to begin towing the trailer. The system can also use sensors to detect the position of the latching system, as described in more detail elsewhere herein.

FIG. 6 also illustrates proper alignment and mating of air seal 114 on the tractor coupling head and air seal 142 on the trailer coupling head. In most cases there are two sets of mating air seals, one set used to fluidly connect a brake air line of the tractor to the brake air line of the trailer, and the other set used to fluidly connect an emergency brake air line of the tractor to the emergency brake line of the trailer. In an example the air seals are the same seals used in the common "glad hand" type manual couplings used in the trucking industry to connect tractor air lines to trailer air lines.

Figure 7B:
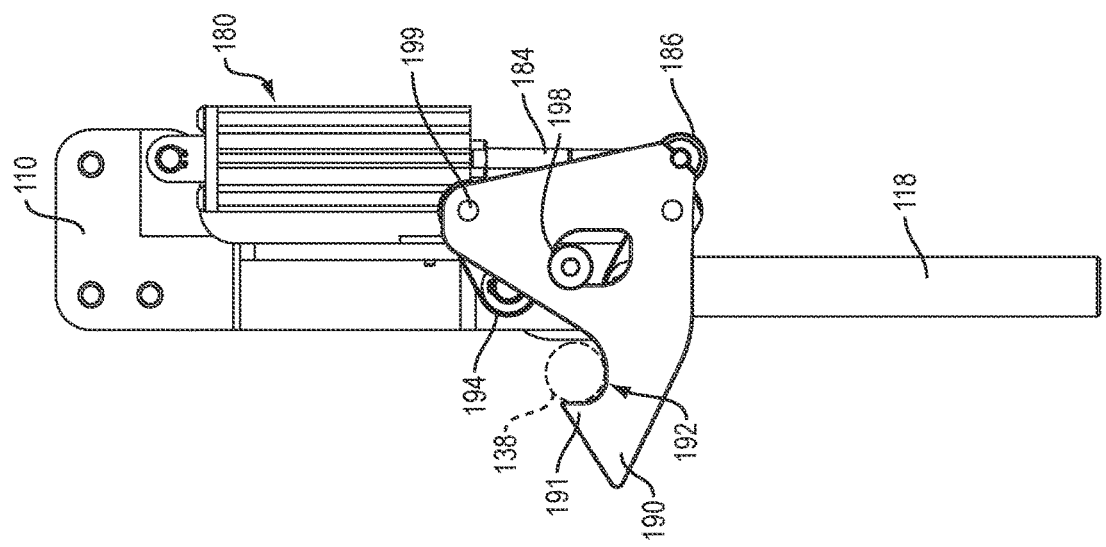
FIG. 7A illustrates a latching mechanism of the tractor coupling head in the unlatched position, and FIG. 7B in the latched position.
Figure 7A:
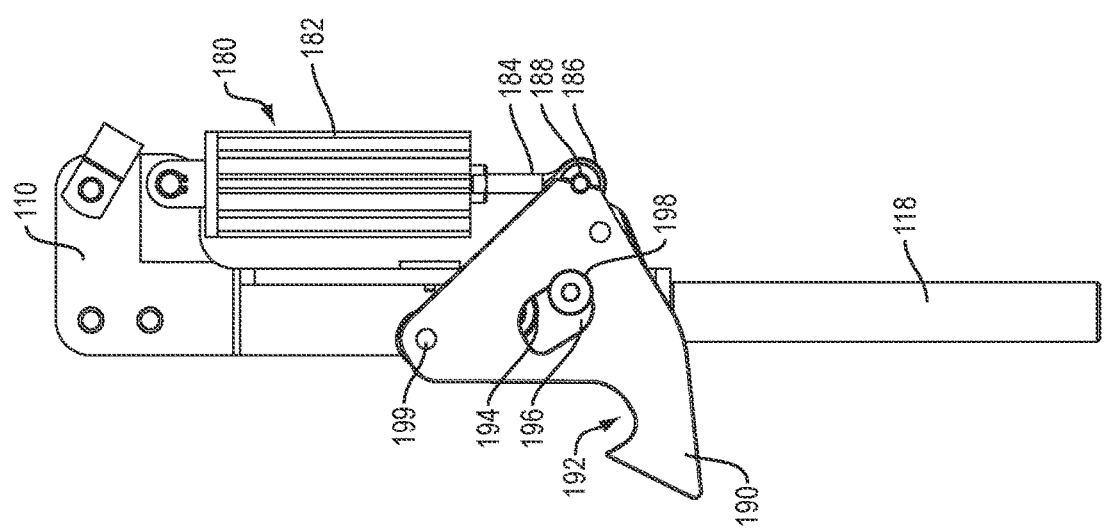

FIG. 7A illustrates a latching system of the tractor coupling head in the position where it is unlatched from the trailer coupling head, and FIG. 7B in the latched position. The latching system is used to latch the tractor and trailer coupling heads together, to accomplish and maintain the air/electrical coupling. The latching system also couples/decoupled the tractor coupling head from its carrier. In a general sense, the latching system serves multiple purposes. One is to clamp the tractor coupling head to the trailer coupling head with sufficient force to compress the glad-hand seals and create an air seal. Another is to interface with the tractor coupling head carrier in the unlatched position to retain the tractor coupling head inside of the carrier.

Hydraulic actuator/mover 180 moves shaft 184 with shaft end 186 in and out. Linkage arm 190 is coupled to end 186 and pivots on fixed pin 194 and pivot point 199. Fixed pin 198 that is within slot 196 establishes travel end points. Arm 190 has saddle 192 and clamp point 191. Shaft 138 of the trailer coupling head is received in saddle 192. As the linkage is moved and approaches the latched position, the mechanical advantage increases at the clamp point location on latch. After the linkage reaches the latched position it goes through an "over center" position at which point the actuator will not have to exert any force to keep the coupling heads clamped to each other. See FIG. 7B. A hard stop pin 198 and associated feature (slot 196) are located so that the latching mechanism can only move a very small amount past this "over center" position so that the two coupling heads are clamped to each other. The actuator is not needed to hold them together in this position. The clamp force will be maintained by the hard stop feature. The linkage will be stable in this position, clamping the glad-hand seals together and/or keeping the electrical connectors coupled together. In order to un-latch the coupling heads, the actuator retracts and supplies a force to bring the linkage past the over center position and back to the un-latched configuration. In an example the two latch arms are connected by a rod across the back. This rod serves a double purpose, as when the latch is unlatched from the trailer coupling head the rod catches on a feature of the tractor coupling head carrier (such as feature 152, FIG. 6) and latches to it.

Figure 8A:
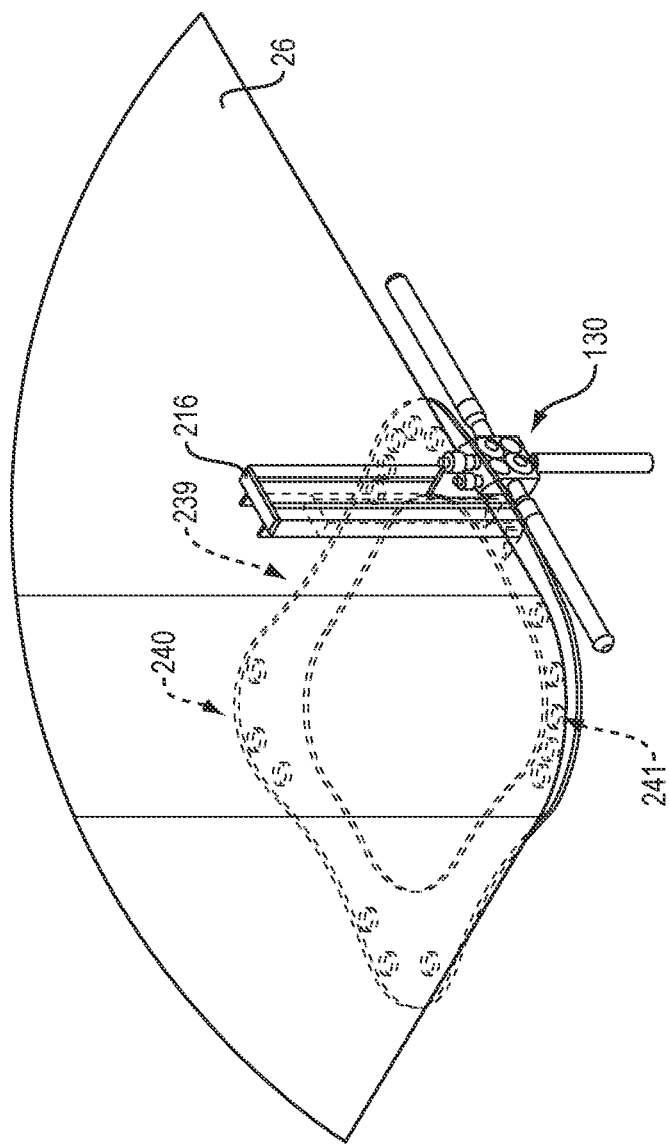
FIG. 8A illustrates an exemplary trailer coupling assembly that includes a frame and a coupling head.
Figure 8C:
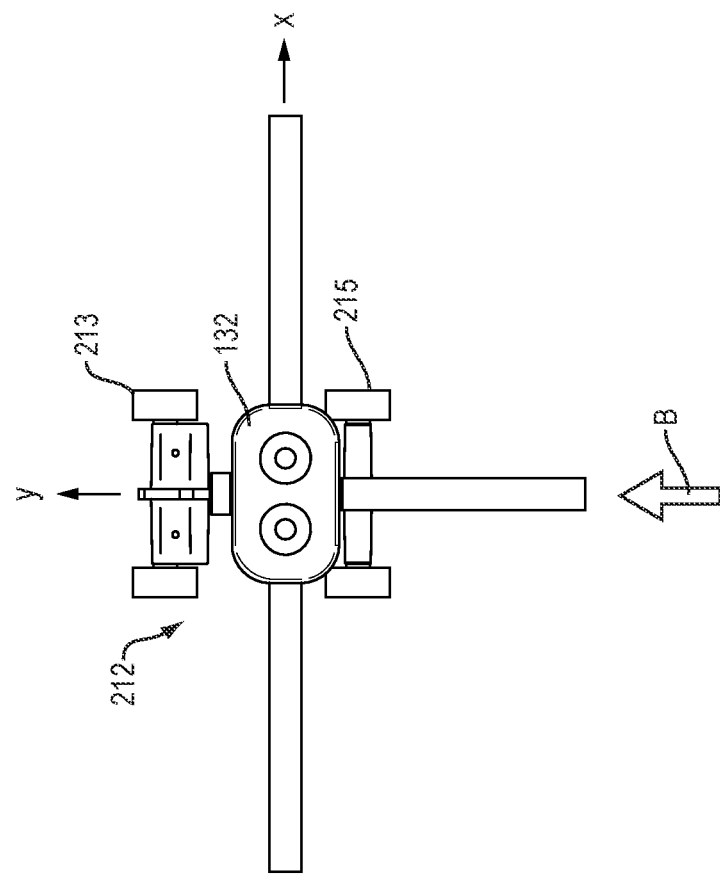
FIGS. 8C and 8D are partial rear and side views, respectively.
Figure 8B:
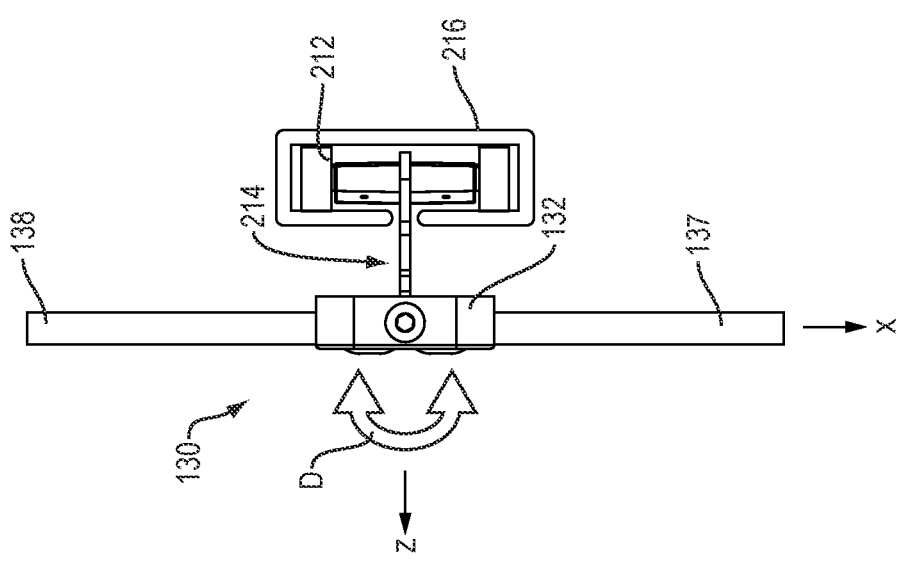
FIG. 8B is a top view of the coupling head.
Figure 8D:
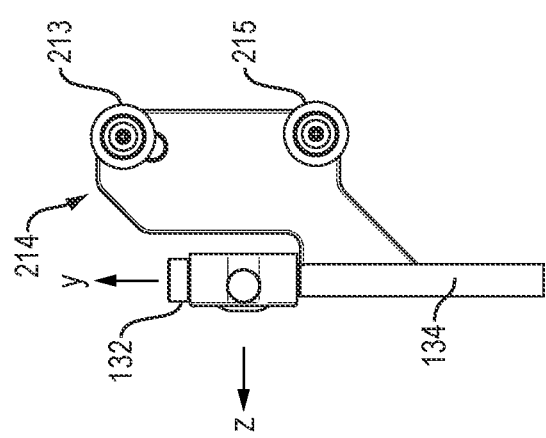

FIG. 8A illustrates an exemplary trailer coupling assembly 239 that includes a generally annular frame 240 and a coupling head 130 carried by the frame. FIG. 8B is a top view of the coupling head, and FIGS. 8C and 8D are partial rear and side views, respectively. In an example frame 240 is magnetically coupled to trailer underside 26 using magnets 241. Alternatively, particularly for attachment to a container on chassis trailer arrangement (where there is typically a large steel bar on the front of the container), the frame can be configured to magnetically attach to the top and/or front face of the bar. These frame attachments may include a flange on a side, to align the frame to both the side of the trailer and the front face of the trailer, for consistent positioning of the trailer coupling head. Installation can be done without tools by aligning the frame to the trailer and letting the magnets attach to the trailer surfaces. Removal can be performed with either a separate or integrated pry tool, or a demagnetizer, for example.

The trailer coupling head (including the body with its seals and fittings, and the horizontal and vertical alignments shafts) is coupled to a carriage 214 that has roller set 212 comprising top rollers 213 and bottom rollers 215. These rollers can roll within hollow roller guide (tube) 216. This allows the coupling head to move up and down along the Y axis, as indicated by arrow B. Also, the carriage can have some play relative to the guide to allow the trailer coupling head to pivot about the Y axis, as indicated by arrow D, to provide for this DOF of the trailer coupling head. In an example the Y-axis pivoting can be accomplished by including an opening in body 132 that lies along the Y axis and with the top of shaft 134 located in this opening and configured such that body 132 can rotate about the Y axis relative to shaft 134.

In an example, in order to achieve a rotational DOF in the trailer coupling head about the Y axis, the trailer coupling head is mounted to a carriage with only its rotation about the Y axis left free relative to the carriage. The carriage has rollers attached to it meant to roll inside of an aluminum extrusion which will act as a track for the rollers. The carriage rolling inside of the extrusion allows for the translation in the y direction necessary for the tractor and trailer coupling heads to come into alignment. The carriage may be sprung in the positive y direction by a constant force spring against an adjustable hard stop to set its default position. The constant force spring(s) can be made part of the roller assembly. Setting the position of the carriage against an adjustable hard stop will allow for its positional tolerance zone to be reduced. If its default position were driven by the spring stiffnesses in the assembly then this would introduce error into its resting location due to the uncertainties in the spring constants and friction within the system. In order to eliminate this uncertainty the carriage may be sprung towards the positive y extreme of its range of motion which would mean that the tractor coupling head carrier would only ever push down on the trailer coupling head to bring it into alignment. Use of a constant force spring is desired since the maximum y deflection of the coupling head is large enough that a spring with a linear spring constant could introduce undesirable force levels into the mechanism when attempting to deflect the trailer coupling head to its lower extreme in the y direction. The force needed to deflect the trailer coupling head in the negative y direction should be minimized since it contributes to jamming of the coupling mechanism and increases the necessary motor torque for the delivery linkage.

Figure 9:
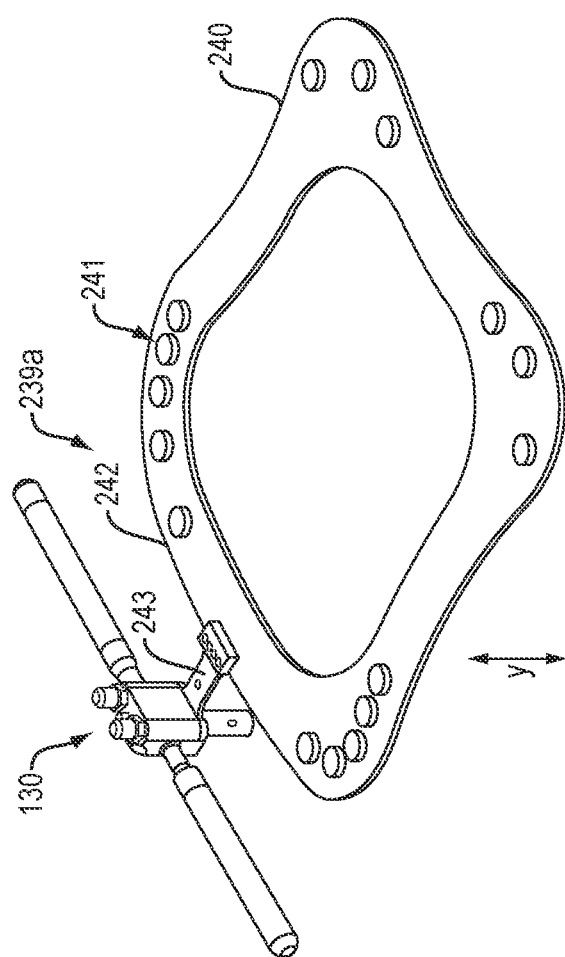
FIG. 9 illustrates another trailer coupling assembly.

FIG. 9 illustrates another trailer coupling assembly 239*a* that differs from assembly 239 in that only a small amount of vertical compliance is provided for by spring 243 that couples head 130 to front 242 of frame 240. Pictured is a flat leaf spring 243 with no moving parts, but a more complex constant force solution can also be implemented for smoother movement. The flexure can bend up or down to accommodate relatively small vertical misalignment but resists bending in other directions.

Attachment of the trailer coupling head to the trailer can be through a temporary mechanism for easy installation and removal. Permanent magnets can be used to attach to steel elements on trailers. Two of the more common types are storage trailers and container on modular chassis. The trailer coupling head may be modular to a variety of attachment plates or frames.

Storage trailers and refrigerator trailers generally have non-magnetic front and side faces and magnetic bottom faces which allow for the largest attachment force via many distributed magnets. Container on chassis trailers feature a large magnetic (e.g., steel) bar on the front on which magnets can be attached to the top and front face of. Both of these attachment mechanisms can feature a flange on the side for aligning it to the edge of the trailer as well as the front face for consistent positioning. Installation can be done without tools by aligning the plates to the trailer and letting the magnets attach to the surfaces. Removal can be performed with either a separate prying tool, demagnetizer, or lifting cam built into the plates. See, e.g., FIG. 20.

Figure 10:
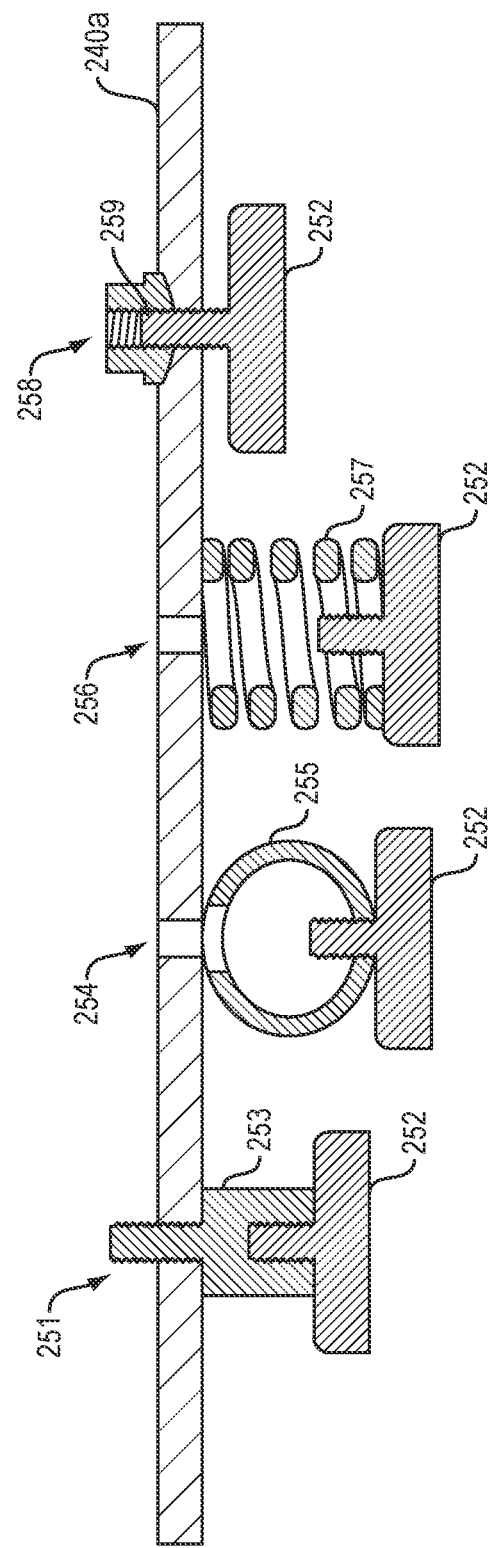
FIG. 10 is a cross-sectional view of different manners of mounting magnets to a frame that allow for movements of the magnets.

Trailer surfaces are often uneven from grease buildup, distortion from impacts, and manufacturing imperfections. Magnetic force is strongest with two parallel plates. As there are a number of independent magnets they can be configured to independently pivot/move to provide the greatest magnetic force to a trailer. FIG. 10 is a cross-sectional view of different manners of mounting magnets to a frame that allow for movements of the magnets. Four different non-limiting mechanisms to mount magnets 252 to frame 240*a* such that the magnets can move are illustrated in FIG. 10. One, 251, is via a threaded rubber shock isolator 253 which allows for twisting in two axes while still applying a normal force. Another 254 is via a plastic ring 255 which allows for one axis of twisting while applying a normal force equal to the spring constant of the plastic ring. Another 256 is via a coil spring 257 that provides for bending in two axes while maintaining some rigidity in the normal axis. Another 258 is via a spherical misalignment nut 259 that can be used in conjunction or independently of these other methods to give better z constraint. Other mechanism that allow for movements of the magnets are contemplated, and are included within the scope of this disclosure.

Figure 11:
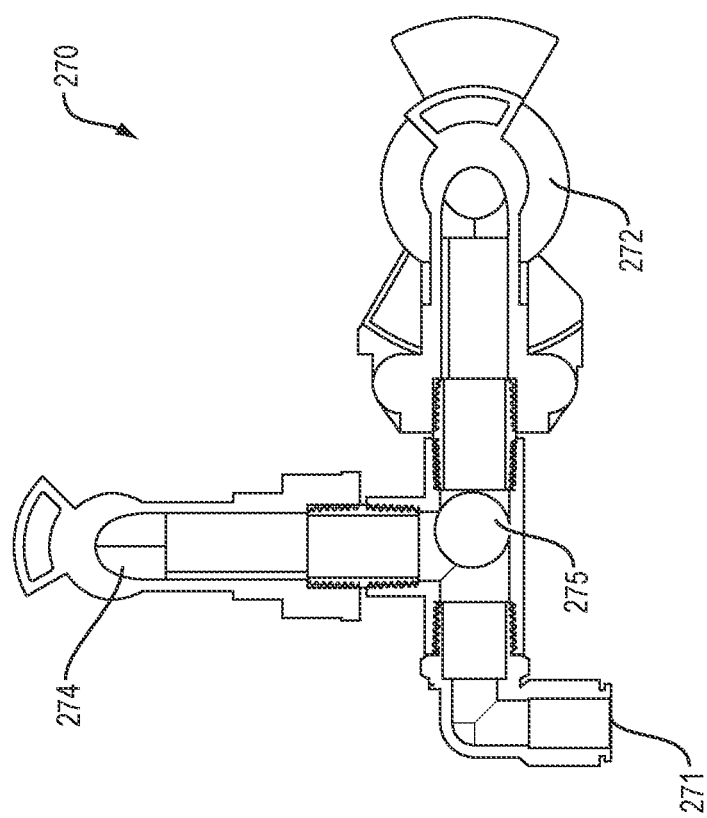
FIG. 11 is a cross-sectional view of an air coupler for the system that accommodates both the present automatic coupling system and standard tractor-trailer air coupling.

FIG. 11 is a cross-sectional view of an air coupler 270 for a system that accommodates both the present automatic coupling system and standard tractor-trailer air coupling via mating manually-operated glad-hand couplers. For automatic coupling to be used in yards that have trucks with automatic coupling arms and without them, the trailer side air attachments should be able to accommodate air pressure from a normal glad-hand coupler and the present automated coupler. Coupler 270 (shown in cross-section) includes standard input 272 and output 274 glad-hand couplers, and auto coupling input 271. Pressure-driven diverter valve element 275 will allow for air flow from either input while maintaining air pressure in the system.

Figure 12:
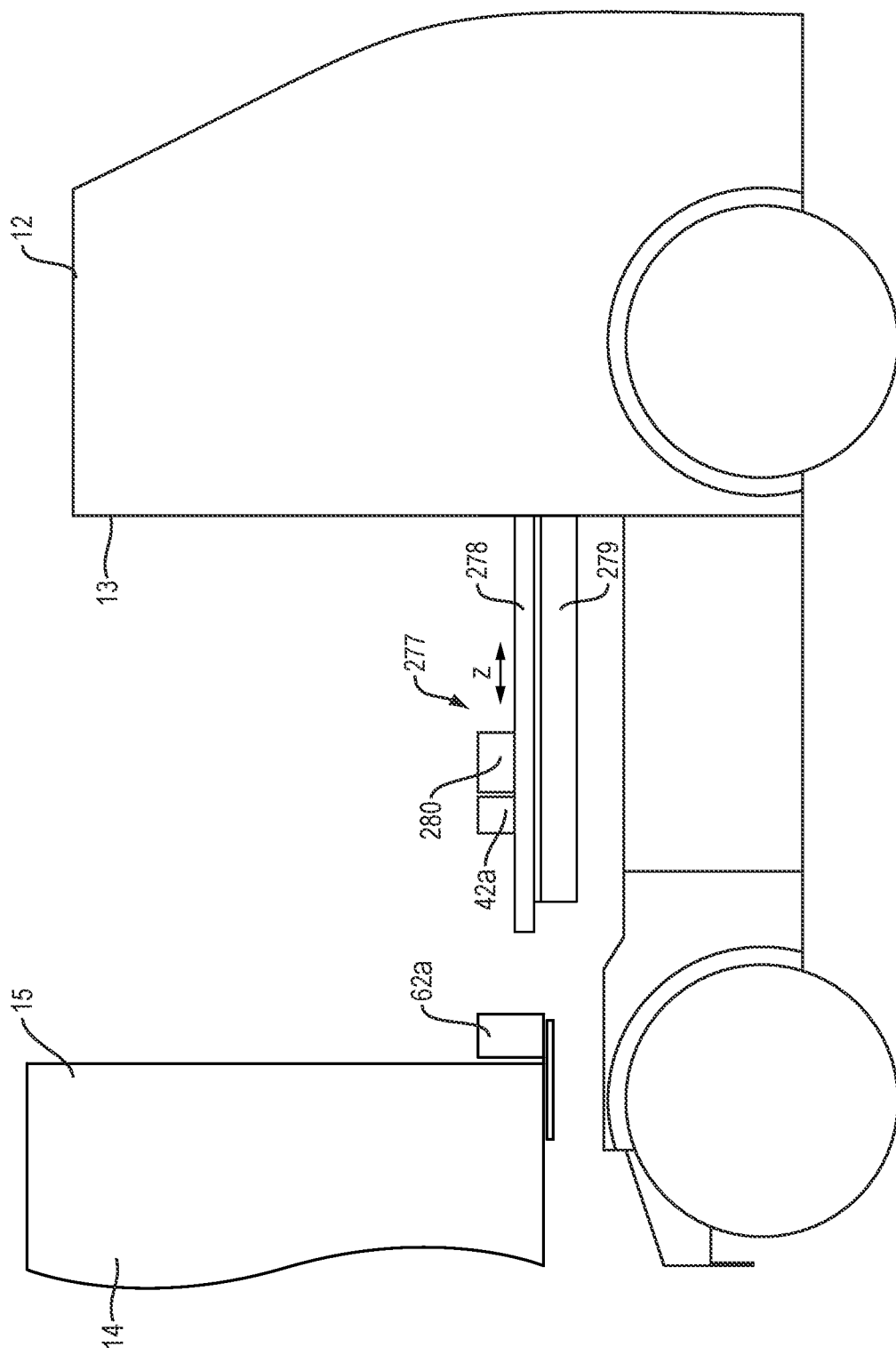
FIG. 12 illustrates another option for moving the tractor coupling head toward and away from the trailer coupling head.

FIG. 12 illustrates another system 277 for moving the tractor coupling head toward and away from the trailer coupling head. In one non-limiting example, rather than an extendable arm the tractor coupling head 42*a* can translate toward and away from the trailer coupling head 62*a* along a track 278. In one non-limiting example, a linear actuator 280 is mounted to the base 279 of the tractor. The coupling head carrier is attached to the linear actuator and so translates back and forth, where the carrier removably carries the tractor coupling head. The tractor carrier and coupling head can be essentially the same as previously described, with a difference being that they are constructed and arranged to mount to the linear actuator rather than to the end of the extendable arm.

More generally, system 277 contemplates moving the tractor coupling head along a path-defining element, such as a track. A linear actuator is one example. In one example a linear actuator has a carrier plate that rides along a ball screw. A rotary motor spins the ball screw and the carrier plate translates. This is one example of a linear actuator, there are other known approaches. One could envision, for example, a rack and pinion geared system where a pinion gear rotates in contact with a stationary rack gear, and the pinion gear translates along the rack as it rotates.

Figure 13:
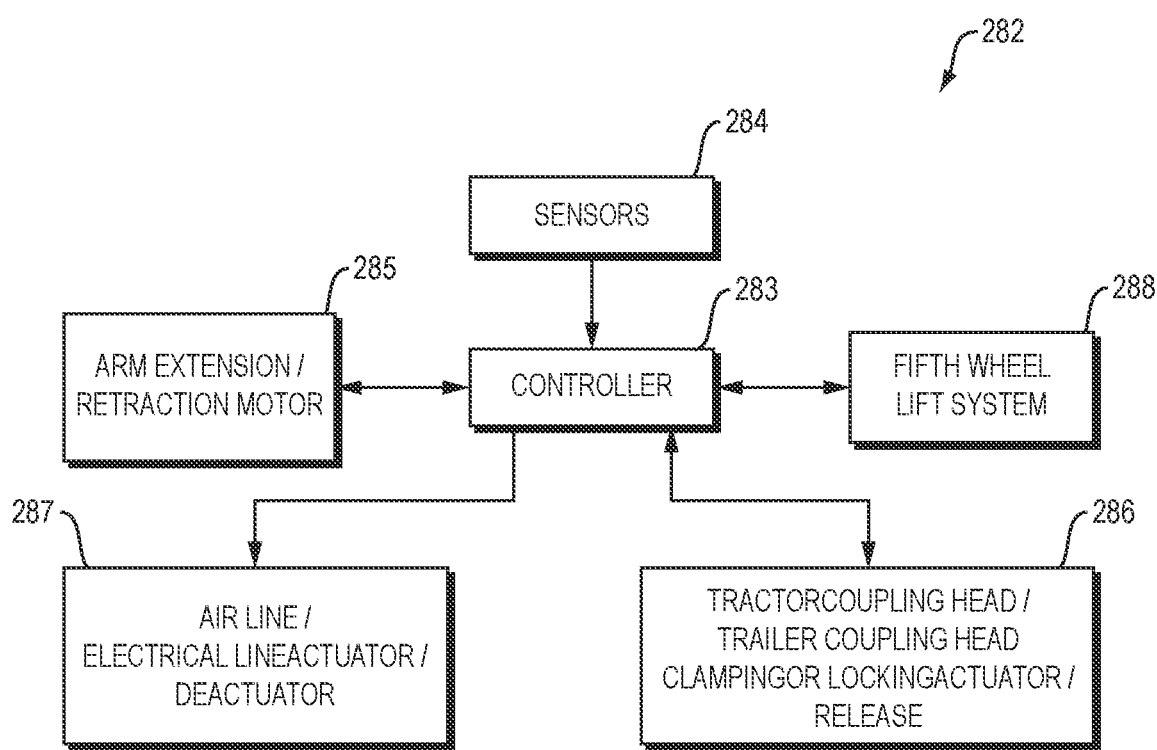
FIG. 13 is a schematic diagram of a control system for the coupling system.

FIG. 13 is a schematic diagram of a control system 282 for the subject automatic coupling system. Controller 283 is input with data from all of the sensors 284, and is configured to control the arm extension/retraction motor 285, the tractor/trailer coupling head clamping 286, and air line/electrical line actuation 287 (for after the heads have been coupled). In systems where the fifth wheel height is controlled (explained in more detail elsewhere herein), the fifth wheel lift system 288 is also controlled.

Figure 14:
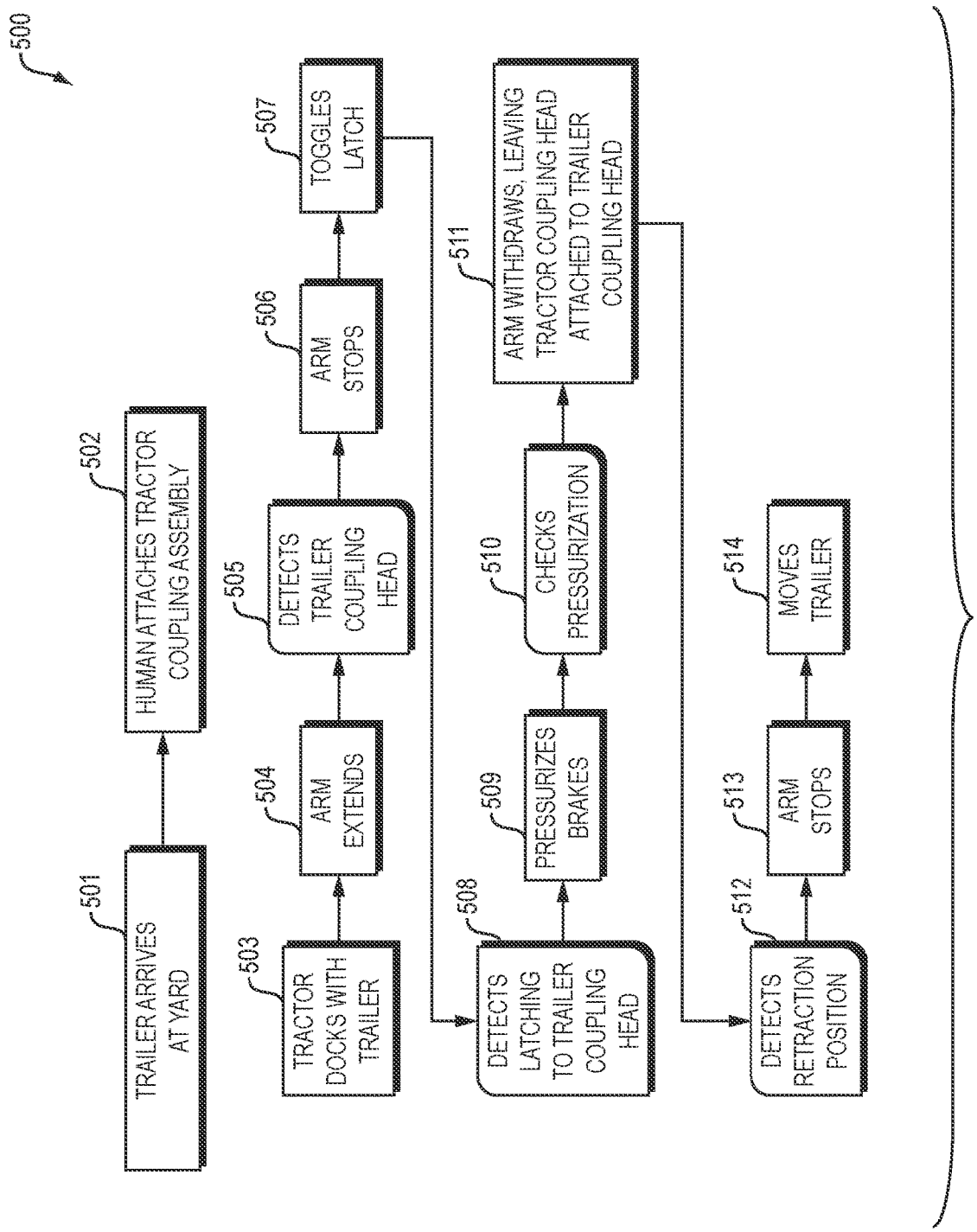
FIG. 14 illustrates steps involved in automatically coupling air lines and electrical lines from a tractor to a trailer.

FIG. 14 illustrates steps involved 500 in automatically coupling air lines and electrical lines from a tractor to a trailer. First, the trailer arrives at the yard and a person attaches the trailer coupling assembly to the trailer, steps 501 and 502. After the tractor docks with the trailer by coupling the fifth wheel to the trailer kingpin (step 503) the controller causes the arm to extend (or otherwise causes the tractor coupling head to translate in the −z direction). When the trailer coupling head is detected to be proximate to the tractor coupling head, step 505, the arm is stopped, step 506. Next the controller causes the toggles of the coupling head locking system to latch the tractor coupling head to the trailer coupling head, step 507, until the latching is detected, step 508. In an example, step 507 involves driving the latch mechanism to uncouple the tractor coupling head from the tractor head carrier and latching the tractor coupling head to the trailer coupling head. The air supply from the tractor is then provided to the trailer to pressurize the brakes, step 509, and the pressurization is checked, step 510. The controller then causes the arm to withdraw, leaving the heads coupled together on the trailer, step 511. Motion proceeds until the arm retracted position is detected, steps 511 and 512. The tractor can then be used to move the trailer, step 514. If the subject system is used with a driverless system, the subject coupling system can be enabled to signal the driverless system that the tractor can move.

Figure 15:
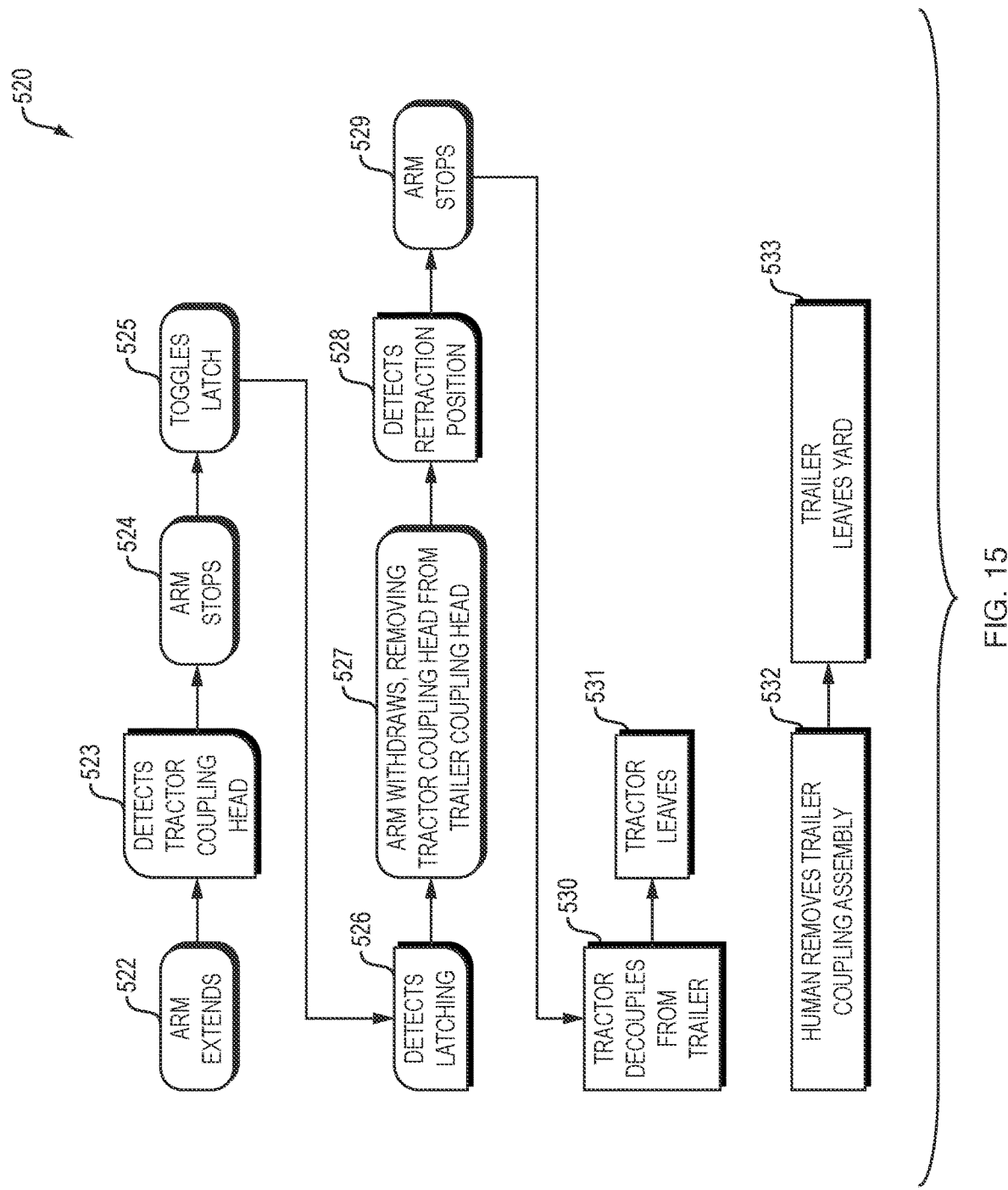
FIG. 15 illustrates steps involved in automatically de-coupling air lines and electrical lines from a tractor to a trailer.

FIG. 15 illustrates steps 520 involved in automatically de-coupling air lines and electrical lines from a tractor to a trailer. The controller causes the arm to extend (or otherwise causes the tractor coupling head carrier to translate in the −z direction), step 522. When the tractor coupling head is detected by the sensor in the tractor coupling head carrier, step 523, the arm is stopped, step 524. Next the controller causes the toggles of the head locking system to operate, so that the tractor coupling head is released from the trailer coupling head and the tractor coupling head is latched to its carrier, step 525. The latching operation ends when the latching of the tractor coupling head to the tractor coupling head carrier is detected, step 526. The controller then causes the arm to withdraw, removing the tractor coupling head from the trailer coupling head, step 527. Motion proceeds until the arm retracted position is detected, steps 528 and 529. The tractor is then decoupled from the trailer (e.g., withdrawing the fifth wheel connector from the kingpin), step 530. The tractor can then leave, step 531. Lastly, and if desired, the person removes the trailer coupling assembly from the trailer, and the trailer can leave the yard, steps 532 and 533.

Figure 16:
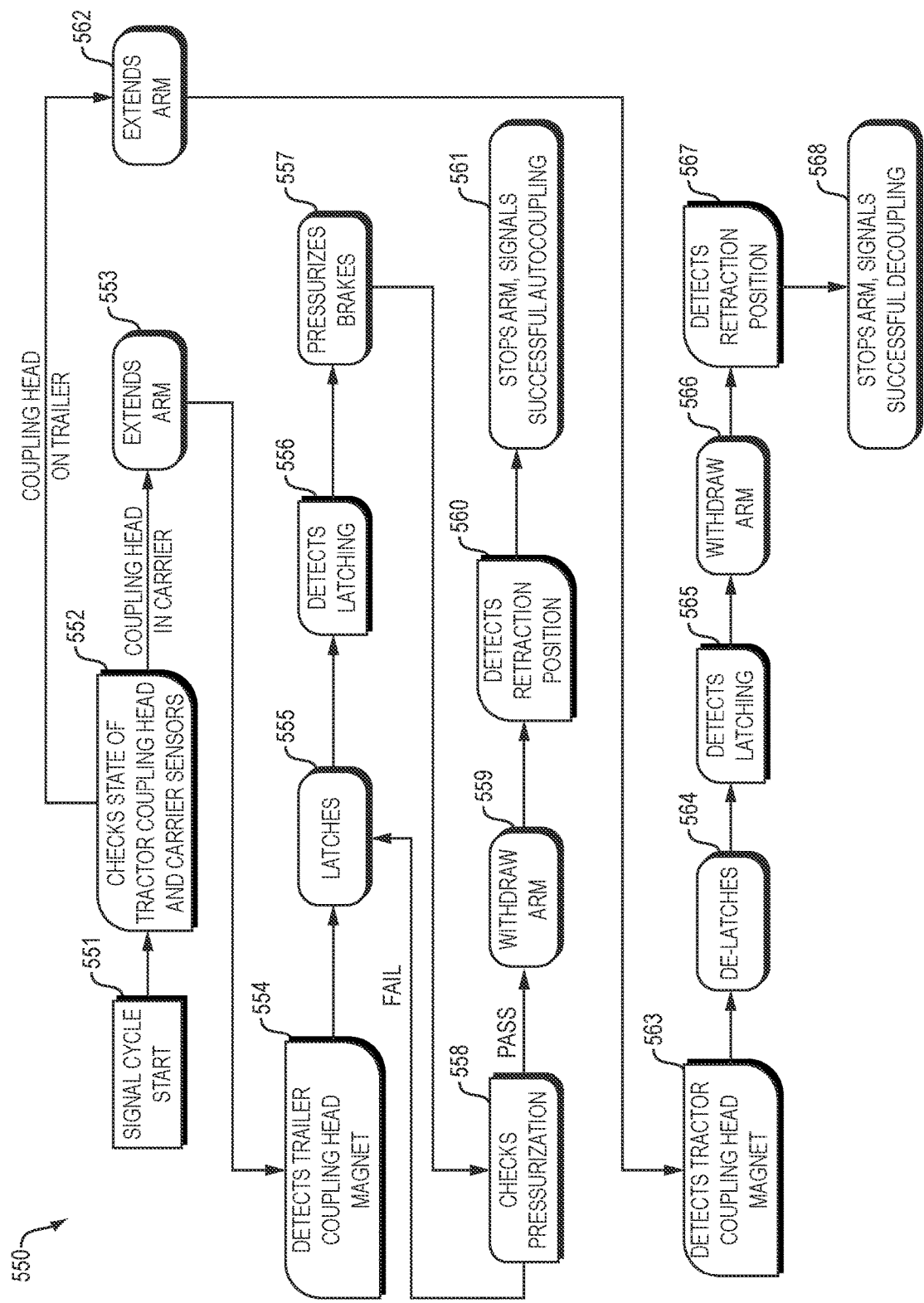
FIG. 16 illustrates operations involved in an automatic trailer coupling system and method.

FIG. 16 illustrate operations 550 involved in an automatic trailer coupling system and method, where the tractor coupling head is being coupled to the trailer, or the tractor coupling head is being removed from the trailer. These operations involve the controller interacting with the system's sensors, and the controlled elements of the system. When a cycle is started (which typically occurs when a person driving the tractor operates a "start" command, or for an autonomous vehicle when the yard management system commands the autonomous tractor to pick up a particular trailer), step 551, the state of the tractor coupling head and its carrier sensors is checked to determine if the tractor coupling head is in its carrier or if it is coupled to the trailer coupling head. If the tractor coupling head is in its carrier then the operation will involve latching the tractor coupling head to the trailer coupling head. The arm is extended, step 553, until the trailer coupling head magnet is detected, step 554. The latch is then operated and the latching of the two heads together is detected, steps 555 and 556. The brakes are pressurized and checked, steps 557 and 558. If the check fails, latching is performed again. If it passes, the arm is withdrawn to its retracted position, steps 559 and 560. The arm is stopped and a successful auto-coupling is signaled, step 561. If in the alternative the tractor coupling head is on the trailer the operation will involve retrieving it from the trailer. The arm is extended, step 562, until the tractor coupling head magnet is detected, step 563. The tractor coupling head's latch is then operated to de-latch from the trailer coupling head and latch to the tractor coupling head carrier, step 564. The latching is detected, step 565, and the arm is withdrawn, step 566. When the retraction (stowed) position is detected, step 567, the arm is stopped and a successful de-coupling is signaled, step 568.

Figure 17:
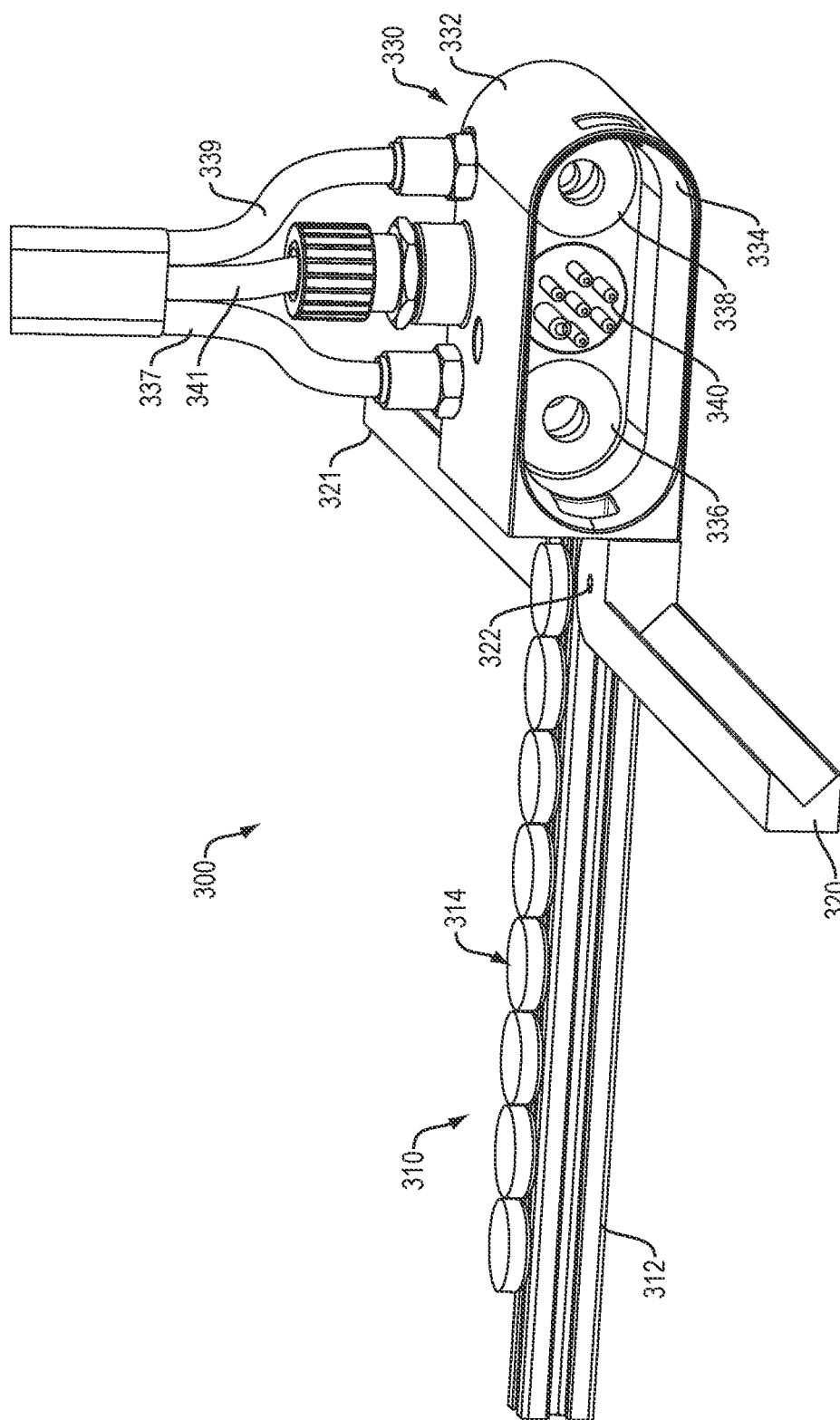
FIG. 17 illustrates a trailer coupling assembly.

FIG. 17 illustrates a different trailer coupling assembly 300. Assembly 300 includes frame 310 that is constructed and arranged to be removably coupled to a trailer. Trailer coupling head 330 is fixed to frame 310. Since coupling head 330 is fixed, it has no DOF of motion relative to the trailer, which simplifies its design. Trailer coupling head 330 includes two air line connectors 336 and 338 (e.g., glad hand seals) and an electrical connector 340 that lead to lines 337, 339, and 341, respectively, to supply the air and electrical signals to the trailer.

Frame 310 includes linear support member 312 that is configured to be located below the bottom of a trailer and carries magnets 314 that couple the assembly to the bottom of the trailer. This places head 330 as close as possible to the bottom of the trailer, which minimizes the load on the magnets which in turn minimizes the number of magnets and the size of the frame underneath the trailer. Also, since the opening 334 of trailer coupling head 330 faces laterally not forward, when the two heads are coupled the coupling forces are primary lateral. Opening 334 is funnel shaped so that it helps to guide the tractor coupling head into proper alignment as the two are mated, as is further explained below. The tractor coupling head can have some compliance relative to its carrier so that it can be successfully guided into proper alignment with the tractor coupling head. The linear nature of the magnet array provides a substantial force that resists twisting or sliding of the frame during the coupling action.

Assembly 300 also includes horizontal alignment rods or tracks 320 and 321 that lie along the X axis. Rods 320 are sized and shaped to interface with rollers on the tractor coupling head as explained below. In an example rods 320 and 321 are pivotable relative to support 312 (pivot 322 for rod 320 identified in the drawing), so that in the stowed position they can lie alongside support 312. This minimizes storage space that needs to be used for the trailer coupling assembly. Additional magnets can be placed on the tops or inward-facing sides of rods 320 and 321 if it is desirable to couple the frame to the trailer with more force.

Figure 18A:
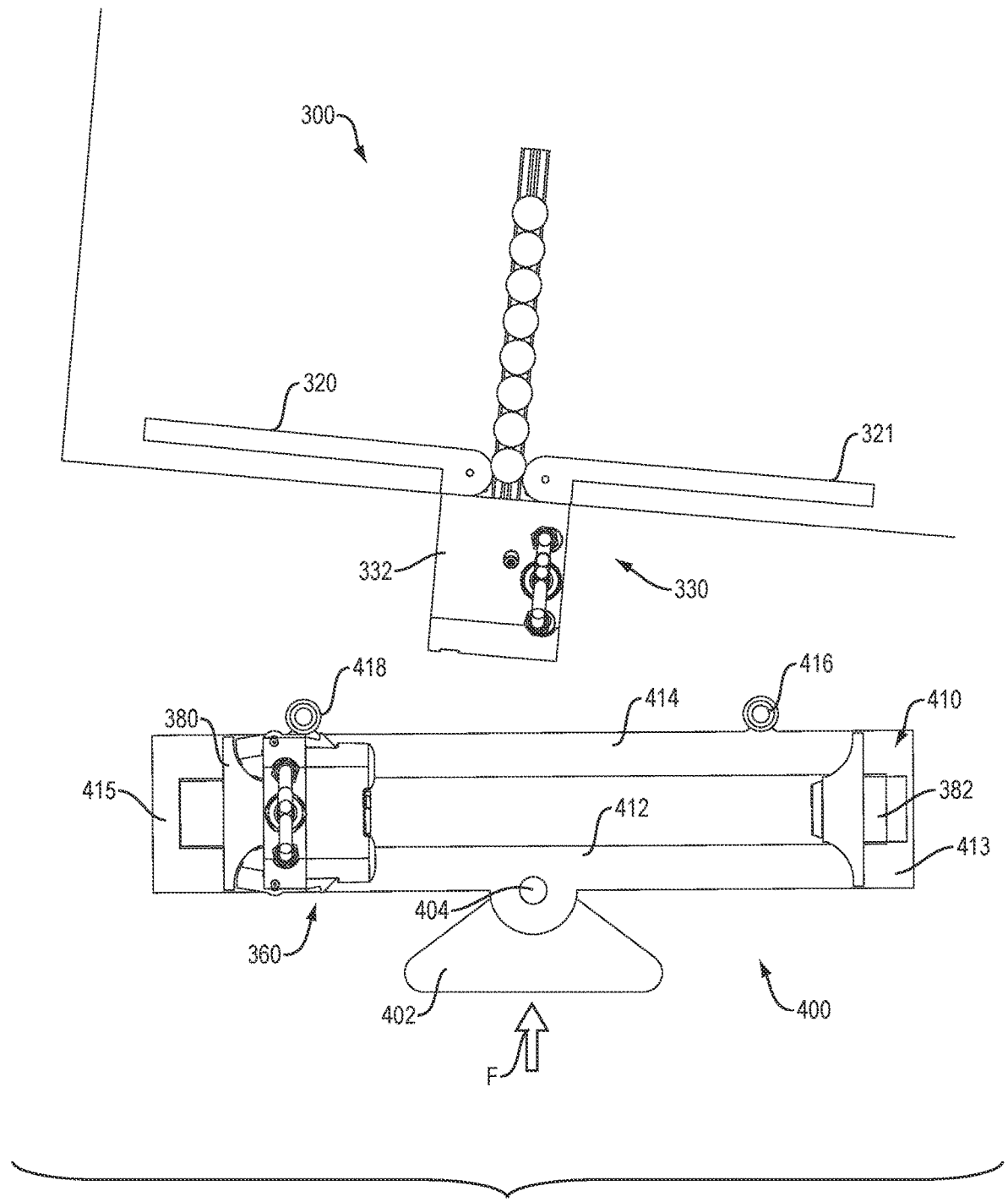
FIG. 18A illustrates a tractor coupling head and coupling head carrier about to engage with the trailer coupling assembly of FIG. 17.
Figure 18B:
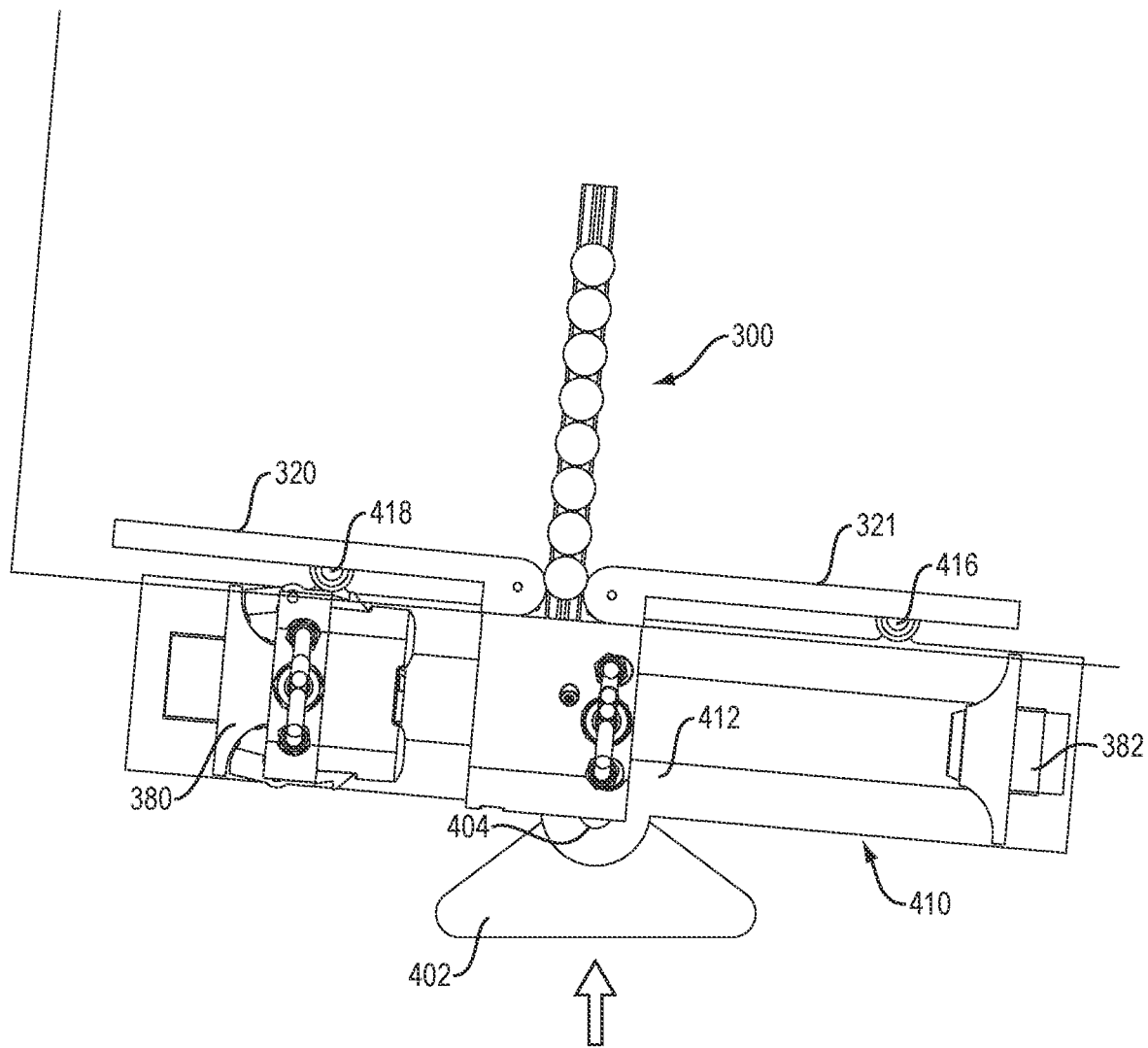
FIG. 18B shows the two aligned and ready to be engaged.

FIG. 18A illustrates a tractor coupling head carrier assembly 400 that includes tractor coupling head 360 and coupling head carrier 410. Assembly 400 is moved along the Z axis toward and away from the trailer coupling assembly 300, as indicated by arrow F. FIG. 18B shows the two assemblies engaged but before the coupling heads are engaged together. Y-axis misalignment can be accommodated by controlling the height of the trailer. The trailer height (and thus the height of the trailer coupling head) can be controlled using system controller 283, FIG. 13, which is tied into the tractor's existing fifth wheel lift system 288. In an example height control is accomplished by sensing and actively controlling the angle of tractor boom 22, FIG. 1. Boom angle sensing can be accomplished with an inclinometer mounted to boom 22. The angle of the top surface of the fifth wheel coupling is very nearly equal to the slope of the ground that the trailer is resting on. A second inclinometer mounted to the fifth wheel could be used to monitor the slope of the ground and account for it in the control system. This can reduce the amount of y-direction alignment error. If the height of the trailer coupling head above the boom is known (e.g., by measurement after the trailer coupling head assembly is installed on a trailer), the control system can be designed to automatically control the boom angle and thus the y location of the trailer coupling head.

By measuring boom angle relative to the ground the trailer coupling head can generally be located to within a few inches of accuracy, with the lead contributor to uncertainty being the length of the trailer affecting the pitch, and the hilly environment the trailer is on adding uncertainty to angles. To achieve higher accuracy, the angle of the fifth wheel itself (which sits flush to the bottom face of the trailer) can be measured. As the trailer is raised up by the boom, the trailer will begin to tilt backwards. Shorter length trailers will tilt more than longer trailers due to their wheelbases on the ground, but by measuring the angle that the trailer is tilted relative to the boom, that can be compensated for. This also compensates for uneven terrain such as hills and slopes, and instead of bringing the trailer to just a set boom angle, the control system will now bring it to a position that satisfies a predetermined relationship between the two measured angle relative to each other. There can still be some uncertainty in the distance from the front face of the trailer to its pivot point for the fifth wheel, but this is generally on the order of sub-inches so can be compensated for via compliance built into the tractor and/or trailer coupling head, and/or the arm.

Additionally or alternatively, the trailer's front edge height position can be measured. In an example a pair of laser rangefinders spaced slightly vertically, set around the coupling height, can be used. By raising the trailer into them, eventually the lower of the two rangefinders will stop measuring the front face of the trailer and will go off the edge and measure a distance below the trailer. By detecting this large difference between the two rangefinders, the trailer coupling head is now known to be between the two rangefinders and raising can be stopped, providing sub-inch accuracy.

By using the fifth wheel boom control which already exists in current tractors, Y axis translation is accomplished without having to include it in either of the components that are added to the system to accomplish automated coupling. Since a trucking yard will need a large number of trailer coupling assemblies, including the Y axis DOF in the trailer coupling assembly increases their size, causing storage issues, and also increases their cost. Including Y axis translation in the arm would increase its cost as well.

Tractor coupling head carrier 410 includes a frame with frame members 412-415 and rollers 416 and 418 carried on member 414 and located, sized, and shaped such that they will engage with rods or rails 320 and 321. For example, rails 320 and 321 can have a unique shape (e.g., the v shape shown) and the rollers can have a complementary shape (e.g., a projecting V shape that fits into the rail). The two heads may not be aligned well enough for them to mate properly. For example, there may be a small height difference (Y axis alignment error) and/or a slight misalignment about the X axis (which can be caused if the front of the trailer is not vertical, which can occur when the trailer is raised by the tractor's fifth wheel), and/or a misalignment (due to the trailer being at an angle behind the tractor rather than straight behind it) between the two heads. To account for these misalignments, tractor coupling head carrier 410 can pivot about the Y axis (e.g., using a bushing at pivot point 404), caused by the rollers contacting rails 320 and 321. The rail shape and shape of mating rollers allow both a small Y axis height compensation and a small rotation about X axis, which may be needed if the trailer is on a slope relative to the tractor or is otherwise tilted relative to the tractor. In some examples, compliance of the tractor coupling head about the X axis is accomplished passively and mechanically. In an example a "pitch" degree of freedom can be introduced in the mechanism that latches the two heads together that would allow the tractor coupling head to rotate within two circumferential latch slots on the trailer-side assembly. Other examples include an elastic or rubber member between the tractor coupling head and the clamping member, a flexure system to allow rotation of the tractor coupling head without translation, or a shaft and bushing along the X axis with a friction clutch attached to discourage free-rotation but light enough that the friction force could be easily overcome. Additionally or alternatively, the trailer coupling head can be designed to include a small amount of vertical compliance, such as by using the flexure spring shown in FIG. 9. The funnel shapes of the mating heads ensures proper alignment of the mating air seals and the mating electrical connectors as the heads are brought together. The frame is carried by arm end 402 (arm not shown) and is pivotable about the Y axis relative to the arm end about point 404, to provide a rotational DOF about the Y axis. Since this Y axis rotational DOF is moved from the trailer coupling head, the trailer coupling head is simplified as compared to the prior example; in this example it is in a fixed position on the trailer.

If the trailer is parked at an angle (along the Z axis) relative to the tractor and there is yaw between them, as the rollers interface with rails 320 and 321 one roller will contact its rail before the other one. As the tractor head continues to be moved in the negative z direction, the tractor coupling head carrier frame will pivot about point 404, until both rollers contact their rails. Since the tractor coupling head has a Z axis translational DOF, and rotational DOF about the x and y axes, and since Y axis translation is accomplished via control of the fifth wheel (and potentially a flexure in the trailer-side assembly), the two heads will be aligned and can be clamped together.

After the heads are aligned as shown in FIG. 18B, they are moved together by clamping members 382 (which moves along the frame and is able to hold trailer coupling head in place) and clamping member 380 (which moves along the frame and is able to move and push tractor coupling head 360 into fixed trailer coupling head 330).

FIG. 19A is a more detailed view of the tractor coupling head close to engagement with the trailer coupling head, and FIG. 19B shows them engaged. When the heads are engaged glad-hand seals 336 and 362 are sealingly engaged and glad-hand seals 338 and 364 are sealingly engaged. Also, electrical couplings 340 and 366 are functionally engaged. Clamping member 380 is controlled, to move coupling head 360 into coupling head 330. When the heads are clamped together a latching system locks the heads together, so they remain engaged after clamping force is released. In an example the latching system includes latches 372 and 374 that are each pivoting arms of the tractor coupling head, with a terminal hook or catch that is engaged in a mating receiving slot in the trailer coupling head. The latches can be moved (pivoted) using solenoid 387 that is functionally coupled to arm portions 382 and 384 to move these portions, causing the arms to pivot about points 373 and 375. The heads will remain latched until the solenoid is energized to move the arms in the other direction and release the latches.

Figure 20:
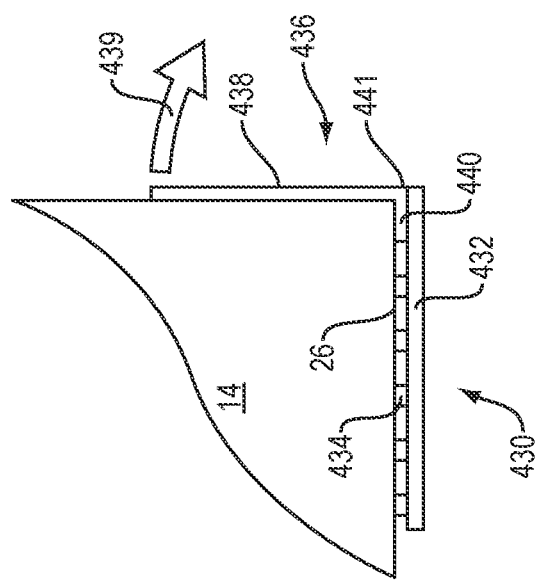
FIG. 20 schematically illustrates a frame for a trailer coupling assembly.

FIG. 20 schematically illustrates an alternative frame 430 for a trailer coupling assembly, mounted to the bottom 26 of trailer 14. Frame 430 illustrates one non-limiting manner of building into the frame a mechanical means of allowing the frame to be removed from the trailer. In this example a pry bar assembly 436 is an integral part of frame 430 and includes long lever 438 that runs up along the front face of trailer 14, and integral short lever 440 that lies underneath the trailer and above frame member 432 that carries magnets 434. The trailer coupling head is not shown in this view. The front corner 441 where levers 438 and 440 meet is pivotably coupled to the end of frame 432. When lever 438 is pulled down and away from the trailer (in direction 439), it pivots about end 441 of lever 440, thus pushing the front end of member 432 away from the bottom of the trailer and releasing the magnets from the trailer.

Elements of some figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in any of the block diagrams, the steps may be performed by one element or a plurality of elements. The steps may be performed together or at different times. The elements that perform the activities may be physically the same or proximate one another, or may be physically separate. One element may perform the actions of more than one block.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, flash ROM, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A trailer coupling assembly for coupling at least one of an air line or an electrical line of a tractor to a trailer that is configured to be pulled by the tractor, comprising:
 a frame that is configured to be mounted to the trailer; and a trailer coupling head that is carried by the frame, wherein the trailer coupling head comprises at least one of a connector for an air line or a connector for an electrical line that are configured to be connected to at least one of a connector for an air line or a connector for an electrical line of the tractor, and at least one alignment rail for facilitating passive rotational alignment about a first axis between the trailer coupling head and a tractor coupling head,
 wherein the alignment rail folds up for storage.

2. A trailer coupling assembly for coupling at least one of an air line or an electrical line of a tractor to a trailer that is configured to be pulled by the tractor, comprising:
 a frame that is configured to be mounted to the trailer; and a trailer coupling head that is carried by the frame, wherein the trailer coupling head comprises at least one of a connector for an air line or a connector for an electrical line that are configured to be connected to at least one of a connector for an air line or a connector for an electrical line of the tractor, and at least one alignment rail for facilitating passive rotational alignment about a first axis between the trailer coupling head and a tractor coupling head,
 wherein the tractor coupling head is constructed and arranged to be removably clamped in place to the trailer coupling head, wherein a latch and a solenoid that is configured to move the latch allow the tractor coupling head to either remain with trailer coupling head or retract from the trailer coupling head.

3. A trailer coupling assembly for coupling at least one of an air line or an electrical line of a tractor to a trailer that is configured to be pulled by the tractor, comprising:

a frame that is configured to be mounted to the trailer; and a trailer coupling head that is carried by the frame, wherein the trailer coupling head comprises at least one of a connector for an air line or a connector for an electrical line that are configured to be connected to at least one of a connector for an air line or a connector for an electrical line of the tractor, and at least one alignment rail for facilitating passive rotational alignment about a first axis between the trailer coupling head and a tractor coupling head, wherein the trailer coupling head is configured to move in at least one DOF relative to the frame.

4. The assembly of claim 3, wherein the motion of the trailer coupling head in the at least one DOF relative to the frame assists alignment of the trailer coupling head with the tractor coupling head.

5. The assembly of claim 3, wherein the first axis is a vertical axis.

6. The assembly of claim 3, wherein the alignment rail comprises a structure that references the front, bottom edge of the trailer.

7. The assembly of claim 3, wherein the trailer coupling head comprises an opening for receiving the tractor coupling head.

8. The assembly of claim 7, wherein the trailer coupling head comprises alignment features, wherein when the tractor coupling head engages with the trailer coupling head, the alignment features engage with the tractor coupling head to align the tractor coupling head with the trailer coupling head.

9. The assembly of claim 3, wherein the trailer coupling head comprises at least one air line connector and at least one electrical connector.

10. The assembly of claim 9, wherein the trailer coupling head comprises a pair of air line connectors and at least one electrical connector.

11. The assembly of claim 10, wherein the at least one electrical connector is located between the pair of air line connectors.

12. The assembly of claim 3, wherein an alignment structure coupled to the tractor coupling head is constructed and arranged to engage with the alignment rail.

13. The assembly of claim 12, wherein when the alignment structure engages with the alignment rail, a torque is applied about the first axis to rotate the tractor coupling head into alignment with the trailer coupling head.

14. The assembly of claim 3, wherein the tractor coupling head is constructed and arranged to be removably clamped in place to the trailer coupling head.

15. The assembly of claim 3, wherein the at least one DOF is translation along the first axis.

16. The assembly of claim 15, wherein the first axis is vertical, wherein the trailer coupling head is configured to ride along a vertically oriented track that is coupled to the frame.

17. The assembly of claim 16, further comprising a spring, wherein the trailer coupling head is coupled to the spring to bias the trailer coupling head in a neutral position.

18. The assembly of claim 3, wherein the at least one DOF is rotation about the first axis.

19. The assembly of claim 3, wherein the trailer coupling head comprises first and second alignment rails, wherein the second alignment rail is positioned to be orthogonal to the first alignment rail.

20. The assembly of claim 19, wherein the second alignment rail facilitates rotational alignment about a second axis, between the trailer coupling head and a tractor coupling head.

21. The system of claim 3, wherein the frame is removably coupled to the trailer with magnets.

* * * * *